US011088779B2

(12) United States Patent
Mukherjee

(10) Patent No.: US 11,088,779 B2
(45) Date of Patent: Aug. 10, 2021

(54) METHODS AND APPARATUS FOR SUPPORTING TRANSMISSION BURSTS

(71) Applicant: Charter Communications Operating, LLC, St. Louis, MO (US)

(72) Inventor: Amitav Mukherjee, Elk Grove, CA (US)

(73) Assignee: Charter Communications Operating, LLC, St. Louis, MO (US)

( * ) Notice: Subject to any disclaimer, the term of this patent is extended or adjusted under 35 U.S.C. 154(b) by 168 days.

(21) Appl. No.: 16/399,899

(22) Filed: Apr. 30, 2019

(65) Prior Publication Data

US 2020/0351011 A1  Nov. 5, 2020

(51) Int. Cl.
*H04L 1/00* (2006.01)
*H04L 1/16* (2006.01)
(Continued)

(52) U.S. Cl.
CPC .......... *H04L 1/0026* (2013.01); *H04L 1/0061* (2013.01); *H04L 1/1614* (2013.01);
(Continued)

(58) Field of Classification Search
CPC ... H04L 1/0026; H04L 1/0061; H04L 1/1614; H04L 5/0048; H04L 1/16; H04L 5/0057;
(Continued)

(56) References Cited

U.S. PATENT DOCUMENTS

| | | | |
|---|---|---|---|
| 2015/0043368 A1* | 2/2015 | Kim | H04B 7/024 370/252 |
| 2016/0227424 A1 | 8/2016 | Chen et al. | |
| 2018/0049047 A1* | 2/2018 | Lin | H04W 24/02 |
| 2018/0124687 A1* | 5/2018 | Park | H04L 5/0053 |
| 2018/0287682 A1* | 10/2018 | Kwak | H04L 5/0057 |
| 2018/0338253 A1* | 11/2018 | Nagaraja | H04W 24/08 |

(Continued)

FOREIGN PATENT DOCUMENTS

| | | |
|---|---|---|
| EP | 3185458 A1 | 6/2017 |
| WO | 2019050789 A1 | 3/2019 |

OTHER PUBLICATIONS

Notification of Transmittal of the International Search Report and the Written Opinion of the International Searching Authority along with International Search Report and Written Opinion of the International Searching Authority from PCT/US2020/30517 dated Jul. 14, 2020, pp. 1-9.

*Primary Examiner* — Will W Lin
(74) *Attorney, Agent, or Firm* — Straub & Straub; Michael P. Straub; Stephen T. Straub

(57) ABSTRACT

Methods and apparatus for supporting transmission bursts in unlicensed spectrum are described. Different sets of sub-bands within a downlink bandwidth portion of unlicensed spectrum can be, and sometimes are, occupied during different DL transmission bursts depending on channel availability. A user device is configured with channel usage information, e.g. N bitmaps, each bitmap indicating a different control channel resource allocation that may be used for communication with the UE, and/or reference signal information. The UE determines the occupied sub-bands in a DL transmission burst over the bandwidth portion, and determines control channel resource information based on the determined occupied sub-channels. The UE determines CSI-RS measurement locations based on determined sub-band occupancy. In some embodiments, the UE performs in-sync and out-of-sync evaluations based BLER threshold scaling factors, which are based on sub-band occupancy.

19 Claims, 18 Drawing Sheets

(51) Int. Cl.
*H04W 24/08* (2009.01)
*H04L 5/00* (2006.01)
*H04W 24/10* (2009.01)
*H04W 74/08* (2009.01)

(52) U.S. Cl.
CPC .......... *H04L 5/0048* (2013.01); *H04W 24/08* (2013.01); *H04W 24/10* (2013.01); *H04W 74/0808* (2013.01)

(58) Field of Classification Search
CPC .... H04L 5/0094; H04W 24/08; H04W 24/10; H04W 74/0808
See application file for complete search history.

(56) References Cited

U.S. PATENT DOCUMENTS

| | | | |
|---|---|---|---|
| 2019/0058517 A1* | 2/2019 | Kang | H04L 5/0048 |
| 2019/0068252 A1* | 2/2019 | Chen | H04B 7/0647 |
| 2019/0089436 A1* | 3/2019 | Wei | H04L 5/0082 |
| 2020/0154446 A1* | 5/2020 | Yerramalli | H04B 17/309 |
| 2020/0351845 A1* | 11/2020 | Davydov | H04B 7/0626 |

\* cited by examiner

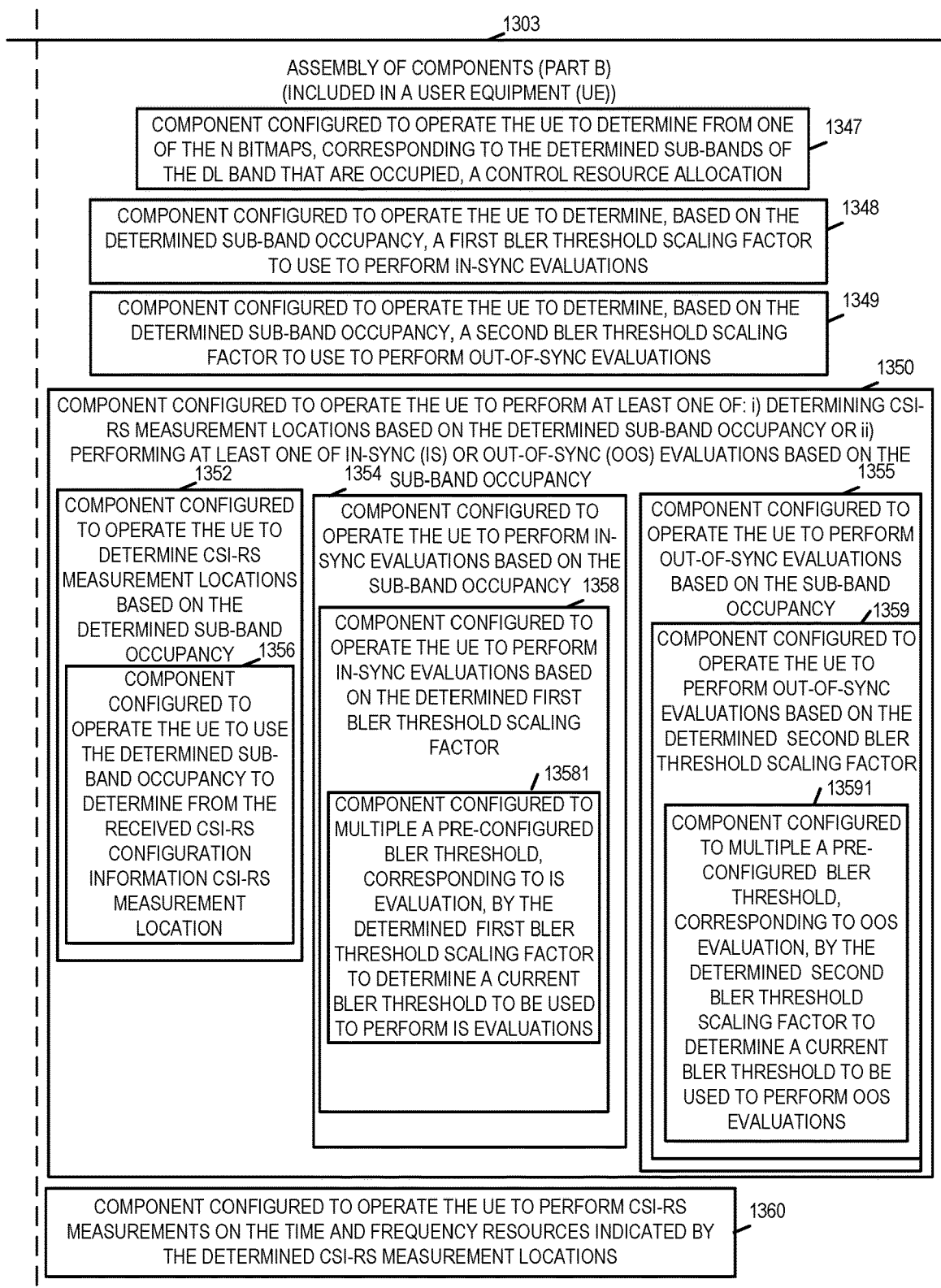

| SET OF SUB-BANDS WHICH ARE OCCUPIED IN DL BWP | NUMBER OF SUB-BANDS WHICH ARE OCCUPIED | SCALING FACTOR FOR OOS THRESHOLD |
|---|---|---|
| {SUB-BAND 1} | 1 | 1/4 |
| {SUB-BAND 2} | 1 | 1/4 |
| {SUB-BAND 3} | 1 | 1/4 |
| {SUB-BAND 4} | 1 | 1/4 |
| {SUB-BAND 1, SUB-BAND 2} | 2 | 1/2 |
| {SUB-BAND 1, SUB-BAND 3} | 2 | 1/2 |
| {SUB-BAND 1, SUB-BAND 4} | 2 | 1/2 |
| {SUB-BAND 2, SUB-BAND 3} | 2 | 1/2 |
| {SUB-BAND 2, SUB-BAND 4} | 2 | 1/2 |
| {SUB-BAND 3, SUB-BAND 4} | 2 | 1/2 |
| {SUB-BAND 1, SUB-BAND 2, SUB-BAND 3} | 3 | 3/4 |
| {SUB-BAND 1, SUB-BAND 2, SUB-BAND 4} | 3 | 3/4 |
| {SUB-BAND 1, SUB-BAND 3, SUB-BAND 4} | 3 | 3/4 |
| {SUB-BAND 2, SUB-BAND 3, SUB-BAND 4} | 3 | 3/4 |
| {SUB-BAND 1, SUB-BAND 2, SUB-BAND 3, SUB-BAND 4} | 4 | 1 |

FIGURE 15

METHODS AND APPARATUS FOR SUPPORTING TRANSMISSION BURSTS

FIELD

The present application relates to communications methods and apparatus, and more particularly, to methods and apparatus related to variable-bandwidth transmission bursts in using unlicensed spectrum.

BACKGROUND

LTE licensed Assisted Access (LAA) and its enhancements (enhanced LAA/Further enhanced LAA (eLAA/Fe-LAA) were introduced in 3rd Generation Partnership Project (3GPP) Releases 13-15 to specify downlink (DL) and uplink (UL) operation in unlicensed spectrum, primary 5 GHz.

A similar effort is under way in release 16 (Rel-16) for Fifth Generation (5G) New Radio (NR) in unlicensed spectrum (NR-U). In the work item in January 2019, it was agreed that for wideband operation in DL with a single serving cell operation within a carrier with bandwidth larger than 20 MHz, multiple Bandwidth Parts (BWPs) can be configured, single BWP activated, gNB may transmit Physical Downlink shared Channel (PDSCH) on parts or whole of a single active BWP where Clear Channel Assessment (CCA) is successful at gNB. It is to be studied how the gNB indicates occupied sub-bands to the UEs.

For NR-U CCAs are performed per 20 MHz sub-bands within the BWP. This implies that based on the per-sub-band CCA outcome, different parts (i.e., 20 MHz-wide frequency sub-bands) of the BWP may be used for DL or uplink transmissions during a transmission burst spanning multiple slots and including multiple CCAs. For example, if the burst starts with a DL CCA, followed by DL slot(s), then switches to one or more UL slots after UL CCA, followed by another DL CCA and DL(slots), then the first set of DL slots may, and sometimes does, occupy different parts of the BWP compared to the second set of DL slots, and the uplink portion, may, and sometimes does, occupy yet another subset of frequency sub-bands.

The current Rel-15 framework for 5G NR is not designed to handle rapidly-varying bandwidth changes. Based on the above discussion, it should be appreciated there is a need for new methods and/or apparatus to support variable-bandwidth transmission bursts, e.g., in 5G NR-U and/or other communications systems.

SUMMARY

Methods and apparatus for supporting transmission bursts, e.g. variable bandwidth transmission bursts, in unlicensed spectrum, e.g., New Radio (NR) unlicensed spectrum, are described. Different sets of sub-bands within a downlink bandwidth portion of unlicensed spectrum can be, and sometimes are, occupied during different DL transmission bursts depending on channel availability assessment. A user device is configured with channel usage information, e.g. N bitmaps, each bitmap indicating a different control channel resource allocation that may be used for communication with the UE, and/or reference signal information. The UE determines the occupied sub-bands in a DL transmission burst over the bandwidth portion, and determines control channel resource information based on the determined occupied sub-channels. The UE determines CSI-RS measurement locations based on determined sub-band occupancy. In some embodiments, the UE performs in-sync and out-of-sync evaluations based BLER threshold scaling factors, which are based on sub-band occupancy.

An exemplary communications method, in accordance with some embodiments, comprises: operating a user equipment device (UE) to receive from a base station information relating to communications channel usage, said information including one or more of: i) N bitmaps, each bitmap indicating a different control channel resource allocation that may be used for communication with the UE, or ii) reference signal information; operating the UE to determine which sub-bands of a DL band being used by the UE are occupied, said determination being a sub-band occupancy determination where a sub-band occupancy indicates which sub-bands of a communications band are being used to communicate with the UE; and operating the UE to perform at least one of: i) determining CSI-RS measurement locations based on the determined sub-band occupancy or ii) performing at least one of in-sync (IS) or out-of-sync (OOS) evaluations based on the sub-band occupancy. An exemplary user equipment (UE) device, in accordance with some embodiments, includes: a receiver; and a processor configured to: operate the user equipment device to receive from a base station information relating to communications channel usage, said information including one or more of: i) N bitmaps, each bitmap indicating a different control channel resource allocation that may be used for communication with the UE, or ii) reference signal information; determine which sub-bands of a DL band being used by the UE are occupied, said determination being a sub-band occupancy determination where a sub-band occupancy indicates which sub-bands of a communications band are being used to communicate with the UE; and operate the UE to perform at least one of: i) determining CSI-RS measurement locations based on the determined sub-band occupancy or ii) performing at least one of in-sync (IS) or out-of-sync (OOS) evaluations based on the sub-band occupancy.

While various features discussed in the summary are used in some embodiments it should be appreciated that not all features are required or necessary for all embodiments and the mention of features in the summary should in no way be interpreted as implying that the feature is necessary or critical for all embodiments.

Numerous additional features and embodiments are discussed in the detailed description which follows.

BRIEF DESCRIPTION OF THE FIGURES

FIG. 13B is a drawing of a second part of an exemplary assembly of components which may be included in an exemplary user equipment (UE) device in accordance with an exemplary embodiment.

FIG. 13 comprises the combination of FIG. 13A and FIG. 13B.

FIG. 15 is a table of exemplary sets of sub-bands which are occupied in an exemplary downlink bandwidth portion (DL BWP), numbers of sub-bands which are occupied, and exemplary corresponding scaling factor for out-of-sync (OOS) threshold in accordance with an exemplary embodiment.

DETAILED DESCRIPTION

Figure 1:
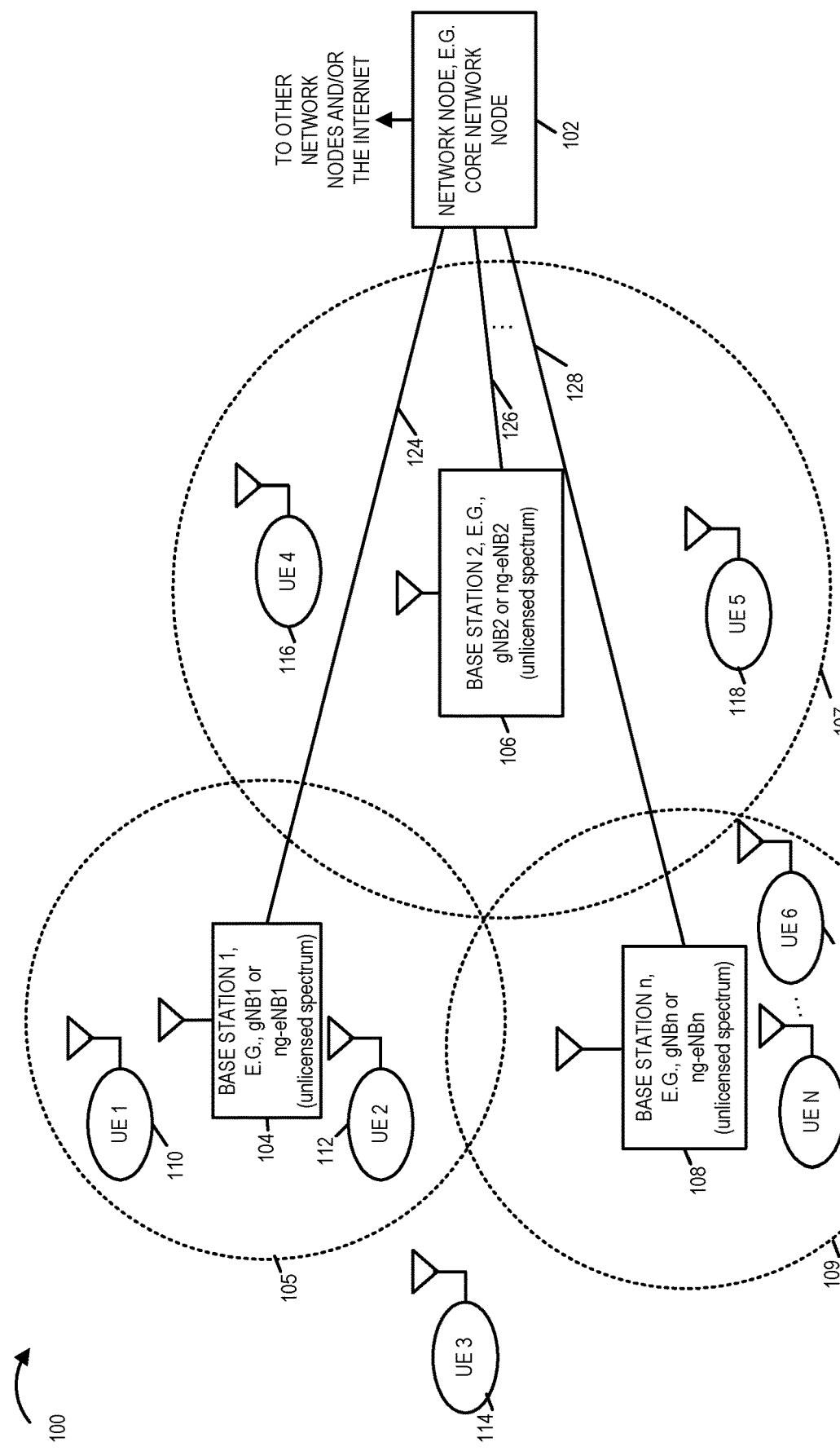
FIG. 1 is a drawing of an exemplary communications system, which supports variable bandwidth transmission bursts in unlicensed spectrum, in accordance with and exemplary embodiment.

FIG. 1 is a drawing of an exemplary communications system 100, which supports variable bandwidth transmission bursts in unlicensed spectrum, in accordance with and exemplary embodiment. Exemplary communications system 100 includes a network node 102, e.g., a core network node, a plurality of base stations (base station 1 104, e.g., gNB 1 or ng-eNB 1, base station 2 106, e.g., gNB 2 or ng-eNB 2, . . . , base station n 108, e.g., gNBn or ng-eNBn), and a plurality of user equipment (UE) devices (UE 1 110, UE 2 112, UE 3 114, UE 4 116, UE 5 118, UE 6 120, . . . , UE N 122). Each of the base stations (base station 1 104, base station 2 106, . . . , base station n 108) has a corresponding wireless coverage area (105, 107, . . . , 109), respectively. Network node 102 is coupled to base station 1 104 via communications connection 124. Network node 102 is coupled to base station 2 106 via communications connection 126. Network node 102 is coupled to base station n 108 via communications connection 128. The base stations (104, 106, . . . , 108) use unlicensed spectrum. In some embodiments, the different base stations (104, 106, . . . , 108) use different bandwidth portions, e.g., different non-overlapping bandwidth portions, of unlicensed spectrum. In some embodiments, a bandwidth portion of unlicensed spectrum includes a plurality of sub-bands. In some embodiments, each sub-band in a bandwidth portion is 20 MHz.

At least some of the UE devices (110, 112, 114, 116, 118, 120, . . . , 122) are mobile devices which may move throughout the communications system 100. In the drawing of FIG. 1, UE 1 110 and UE 2 112 are shown to be currently within the wireless coverage area 105 of base station 1 104. UE 3 114 is shown to be currently outside the coverage areas (105, 107, 109) of the base stations. UE 4 116 and UE 5 118 are shown to be currently within the wireless coverage area 107 of base station 2 106. UE 6 120 and UE N 122 are shown to be currently within the wireless coverage area 109 of base station 3 108.

Figure 2:
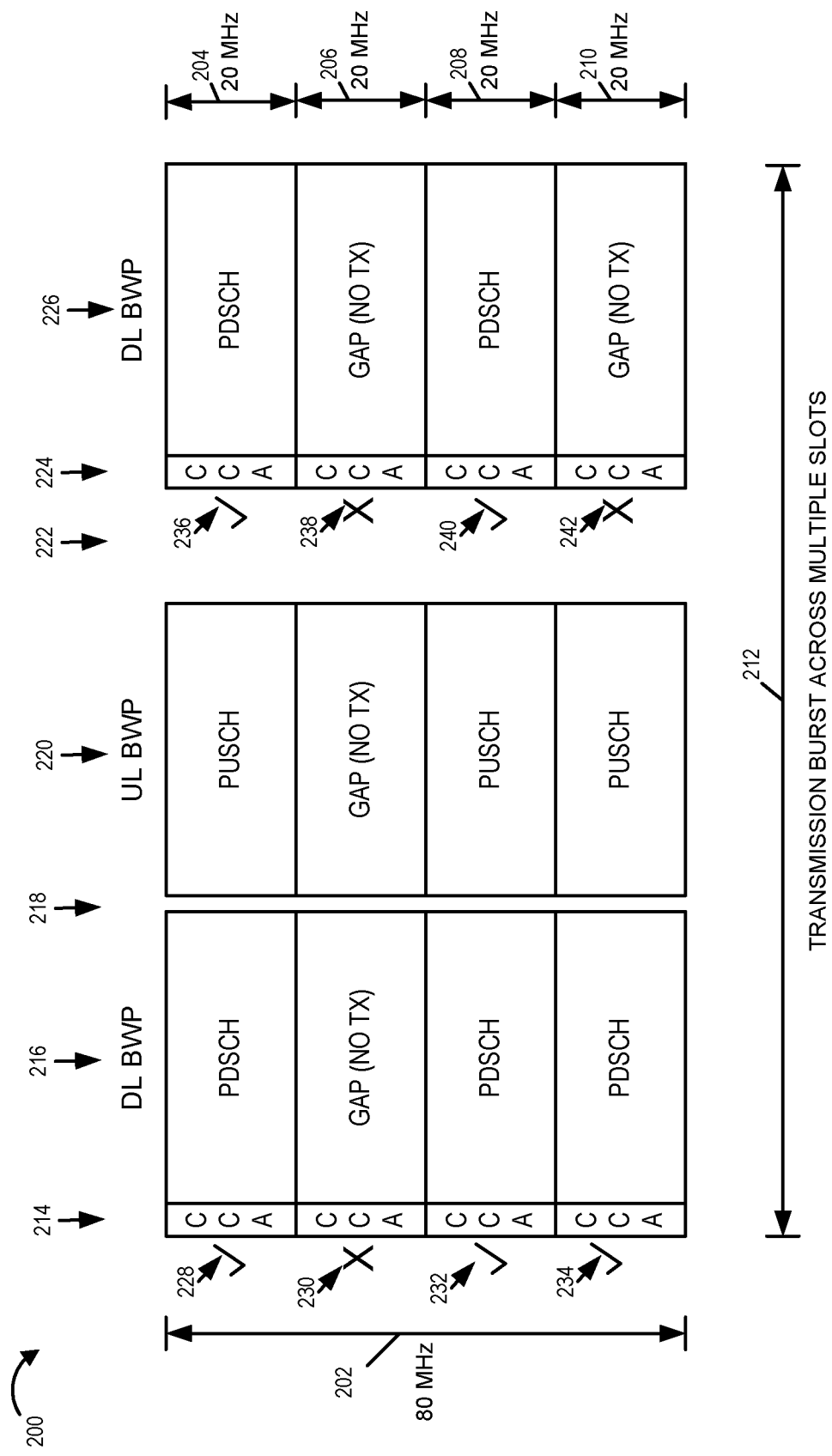
FIG. 2 is a drawing illustrating an example of variable-bandwidth transmission burst with a 80 MHz Bandwidth Part (BWP) comprising four sub-sub bands in accordance with an exemplary embodiment.

FIG. 2 is a drawing 200 illustrating an example of variable-bandwidth transmission burst with a 80 MHz Bandwidth Part (BWP) comprising four sub-sub bands in accordance with an exemplary embodiment. The exemplary BWP of FIG. 2 has a bandwidth 292 of 80 MHz. The exemplary BWP of FIG. 2 includes first sub-band 204, second sub-band 206, third sub-band 208 and fourth sub-band 210, and each of the 4 sub bands (204, 206, 208, 210) has a bandwidth of 20 MHz.

In the example of FIG. 2, the transmission burst occurs across multiple slots 212 including a first downlink slot, a first uplink slot and a second downlink slot. In the exemplary burst, CCA is cleared on 3 out of the four sub-bands for the first DL transmission, as indicated by columns 214. Check 226 indicates that the CCA for first sub-band 204 has cleared. X 230 indicates that CCA for second sub-band 206 has failed. Check 232 indicates that the CCA for third sub-band 208 has cleared. Check 234 indicates that the CCA for fourth sub-band 210 has cleared.

Column 216 indicates that during a first downlink transmission time period, 3 out of 4 sub-bands of the BWP are used for the first downlink transmission, which occurs on the Physical Downlink Shared Channel (PDSCH) using the first, third and fourth sub-bands, while there is a gap (no transmission) on the second sub-band.

The first downlink transmission time interval is followed by a gap 218, between the first downlink transmission period and the first uplink transmission period. This is followed by an UL transmission period, as indicated by column 220. In this example, the UL transmission period is without CCAs because the gap 218 is small, e.g. below a minimum size for which CCA is required. Thus UL CCAs are conditional depending upon the gap 218 from the end of the preceding DL time interval.

Column 220 indicates that during a first uplink transmission time period, 3 out of 4 sub-bands of the BWP are used for the first uplink transmission, which occurs on the Physical Uplink Shared Channel (PUSCH) using the first, second and fourth sub-bands, while there is a gap (no transmission) on the second sub-band.

The first downlink transmission time interval is followed by a gap 222. In this example, the gap 222 is large enough to require CCA. CCA is cleared on 2 out of the four sub-bands for the second DL transmission, as indicated by column 224. Check 236 indicates that the CCA for first sub-band 204 has cleared. X 238 indicates that CCA for second sub-band 206 has failed. Check 240 indicates that the CCA for third sub-band 208 has cleared. X 242 indicates that CCA for fourth sub-band 210 has failed.

Column 226 indicates that during a second downlink transmission time period, 2 out of 4 sub-bands of the BWP are used for the second downlink transmission, which occurs on the Physical Downlink Shared Channel (PDSCH) using the first, and third sub-bands, while there is a gap (no transmission) on the second and fourth sub-bands.

In some exemplary embodiments, a user equipment (UE) device determines the location of downlink (DL) control channel resources in a variable-bandwidth burst.

In the current design for Rel-15, for each control resource set in the DL BWP, a respective higher level parameter frequencyDomainResources currently provides a bitmap, where the bits of the bitmap have a on-to-on mapping with non-overlapping groups oft consecutive PRBs.

In accordance with a feature of some embodiments of the present invention, a set of multiple bitmaps is provided to each UE, where each bitmap corresponds to one possible set of occupied sub-bands within the BWP after CCA. The UE determines the appropriate bitmap to use based on an indication from the base station, e.g., gNB, of which sub-bands are occupied within the BWP for the current DL portion of the burst. As a non-limiting example, the occupied su-band information may be, and in some embodiments, is, transmitted using a group-common Physical Downlink Control Channel (PDCCH.) As another example, the UE determines which sub-bands are occupied based on the detection of Physical Downlink Control Channel Demodulation-Reference Signals (PDCCH DM-RS).

Figure 3:
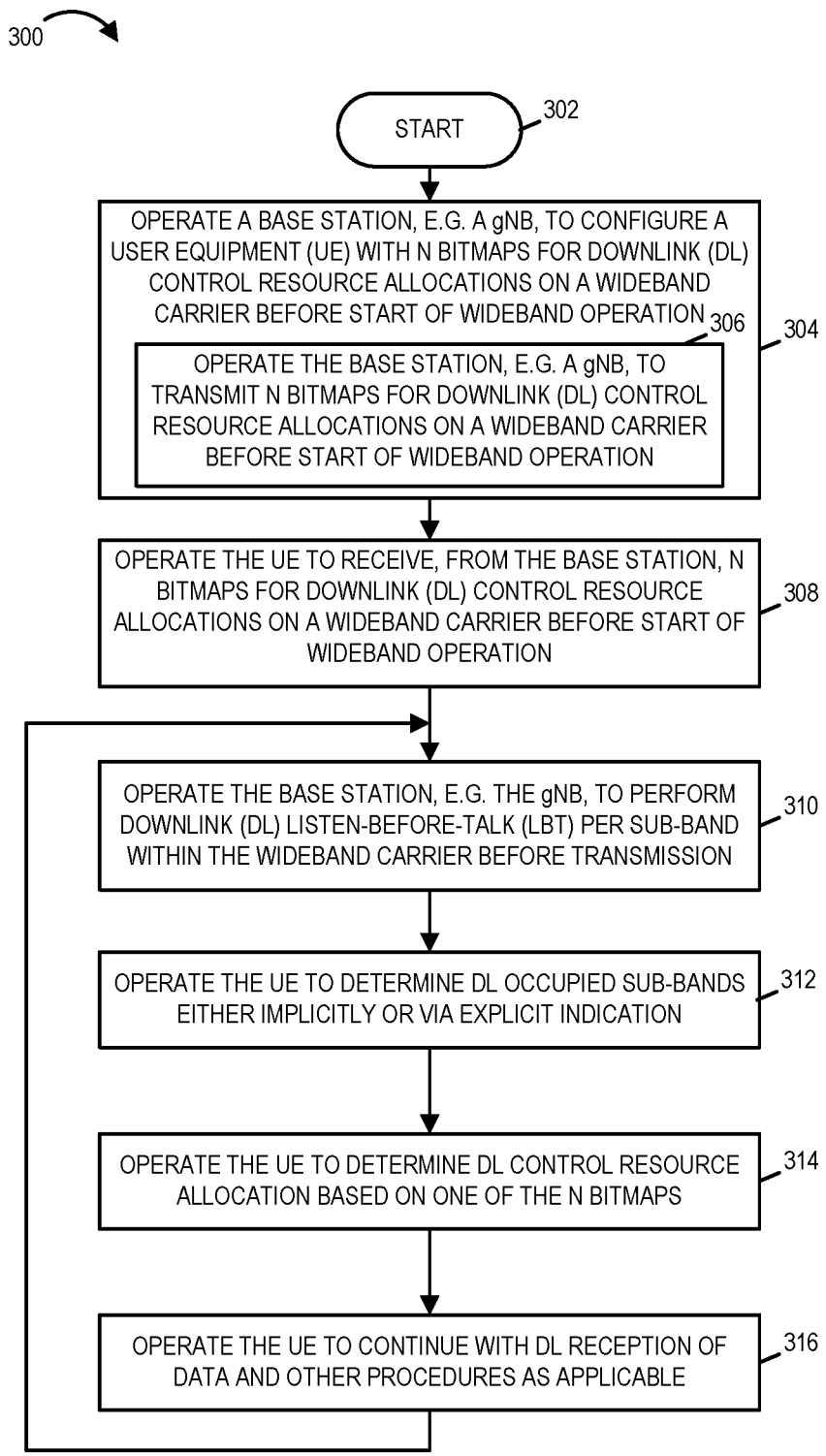
FIG. 3 is a flowchart of an exemplary method of operating a communications system in accordance with an exemplary embodiment.

FIG. 3 is a flowchart 300 of an exemplary method of operating a communications system, e.g., the communications system 100 of FIG. 1, in accordance with an exemplary embodiment. Operation of the exemplary method starts in step 302, in which the communications system is powered on and initialized. Operation proceeds from start step 302 to step 304. In step 304, a base station, e.g., a gNB, is operated to configure a user equipment (UE) with N bitmaps for downlink (DL) control resource allocations on a wideband carrier before start of wideband operation. Step 304 includes step 306 in which the base station, e.g., a gNB, is operated to transmit N bitmaps for downlink (DL) control resource allocations on a wideband carrier before start of wideband operation. The base station is, e.g., base station 1 104 of system 100 of FIG. 1, and the UE is, e.g., UE 1 110 of FIG. 1. Operation proceeds from step 304 to step 308.

In step 308 the UE is operated to receive from the base station, N bitmaps for downlink (DL) control resource allocations on a wideband carrier before start of wideband operation. Operation proceeds from step 308 to step 310.

In step 310 the base station performs downlink (DL) listen-before-talk (LBT) per sub-band within the wideband carrier before transmission. Operation proceeds from step 310 to step 312.

In step 312 the UE determines DL occupied sub-bands either implicitly or via explicit indication. In one exemplary embodiment, the UE implicitly determines which DL sub-bands are occupied based on the detection of Physical Downlink Control channel demodulation-reference signals (PDCCH DM-RS), e.g., if a PDCCH DM-RS is detected by the UE in a sub-band then that particular sub-band is occupied in the BWP for the current DL portion of the burst; however, if the a PDCCH DM-RS is not detected by the UE in a sub-band then that particular sub-band is not occupied in the BWP for the current DL portion of the burst. In one exemplary embodiment, the explicit indication of which sub-bands are occupied is communicated in a signal transmitted by the base station, e.g., using a group common Physical Downlink Control Channel. Thus in step 312 the UE determines a set of DL occupied sub-bands for the BWP. Operation proceeds from step 312 to step 314.

In step 314, the UE determines DL control resource allocation based on one of the N bitmaps. The determined set of occupied sub-bands in the BWP, where at least one sub-band is occupied, will correspond to one of the N bit maps, and that one bitmap is used to determine DL control resources. Operation proceeds from step 314 to step 316.

In step 316 the UE is operated to continue with DL reception of data and other procedures as applicable. Operation proceeds from step 316 to step 310.

In some exemplary embodiments, radio resource management (RRM) and reference signal information measurements, that are used for mobility and link adaptation, respectively, are used in the exemplary embodiment.

In Rel-15, RRM measurements such as reference signal received power (RSRP), reference signal received quality (RSRQ), signal plus interference noise ratio (SINR) can be, and sometimes are, performed on either secondary synchronization signals or CSI-RS. For example, TS-38,215 states that: CSI reference signal received power (CSI-RSRP), is defined as the linear average over the power contributions (in [W]) of the resource elements that carry CSI reference signals configured for RSRP measurements within the considered measurement frequency bandwidth in the configured CSI-RS occasions.

In variable-bandwidth bursts, the resource elements (REs) within the DL BWP that contain configured CSI-RS can change based on the CCA outcome. Therefore in some exemplary embodiments, in accordance with the present invention, a sudden change in occupied RE of RSs is accounted or by the UE when performing measurements. In other words, a UE does not include resource elements in non-occupied sub-bands for RRM and reference signal measurements. In some embodiments, the UE makes a determination as to which resource elements to use based on an indication from the base station, e.g. gNB, of which sub-bands are occupied with the BWP for the current downlink portion of the burst.

Figure 4:
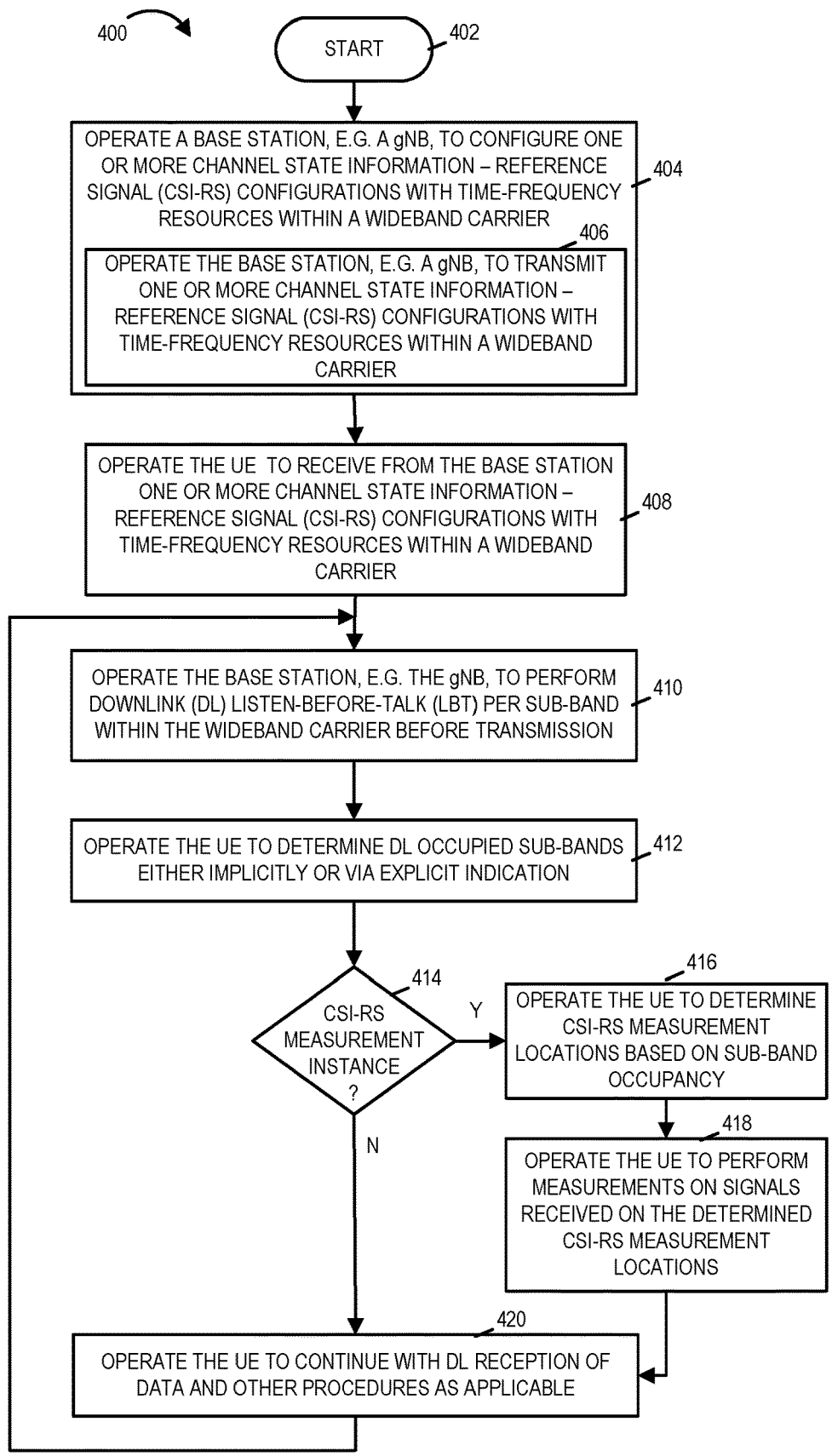
FIG. 4 is a flowchart of an exemplary method of operating a communications system in accordance with an exemplary embodiment.

FIG. 4 is a flowchart 400 of an exemplary method of operating a communications system, e.g., communications system 100 of FIG. 1, in accordance with an exemplary embodiment. Operation of the exemplary method starts in step 402, in which the communications system is powered on and initialized. Operation proceeds from start step 402 to step 404. In step 404, a base station, e.g., a gNB, is operated to configure a user equipment (UE) with one or more channel state information-reference signal (CSI-RS) configurations with time-frequency resources within a wideband carrier. Step 404 includes step 406, in which the base station, e.g., a gNB, is operated to transmit to the UE one or more channel state information-reference signal (CSI-RS) configurations with time-frequency resources within a wideband carrier. The base station is, e.g., base station 1 104 of system 100 of FIG. 1, and the UE is, e.g., UE 1 110 of FIG. 1. Operation proceeds from step 404 to step 408.

In step 408 the UE is operated to receive from the base station one or more channel state information-reference signal (CSI-RS) configurations with time-frequency resources within a wideband carrier. Operation proceeds from step 408 to step 410.

In a step 410 the base station performs downlink (DL) listen-before-talk (LBT) per sub-band within the wideband carrier before transmission. Operation proceeds from step 410 to step 412.

In step 412 the UE determines DL occupied sub-bands either implicitly or via explicit indication. Operation proceeds from step 412 to step 414.

In step 414 the UE determines if a CSI-RS measurement instance is occurring. If the UE determines that a CSI-RS measurement instance is occurring, then operation proceeds from step 414 to step 416, in which the UE determines the CSI-RS measurement locations based on sub-band occupancy. Operation proceeds from step 416 to step 418. In step 418 the UE performs measurements on signals received on the determined CSI-RS measurement locations. Operation proceeds from step 418 to step 420.

Returning to step 414, if the UE determines in step 414 that a CSI-RS measurement instance is not occurring, then operation proceeds from step 414 to step 420.

In step 420 the UE is operated to continue with DL reception of data and other procedures as applicable. Operation proceeds from step 420 to step 410.

Some exemplary embodiments, involve radio link monitoring (RLM) on the serving cell, and accounts for the impact of RLM-RS (either SSB or NZP-CSI-RS). Hypothetical block error rate (BLER) is used to determine in-sync (IS) or out-of-sync (OOS) conditions for either of the reference signal types (SS/PBCH block or CSI-RS). A UE assumes to be IS, if the hypothetical BLER estimated on at least one of the X configured RLM reference signals is below a configurable threshold. On the other hand, the UE assumes to be OOS, if the hypothetical BLER estimated on all configured RLM reference s signals is above yet another configurable threshold.

In Rel 15, a UE can be configured for each DL BWP of a SpCell [11, TS38.321] with a set of resource indexes, through a corresponding set of higher layer parameters RadioLinkMonitoringRS, for radio link monitoring by higher level parameter failureDetectionResources. The UE is provided either a CSI-RS resource configuration index, by higher level parameter csi-RS-Index, or a SS/PBCH block index, by higher level parameter ssb-Index.

In some exemplary embodiments, in accordance with the present invention, if a configured RLM-RS is partially transmitted in frequency domain in variable bandwidth burst case, when utilizing those RLM-RS for RLM, the UE dynamically scales the pre-configured BLER thresholds based on the number of occupied REs of the RLM-RS. This allows the UE to give more weight to those RLM-RS which occupy all of the BWP.

For example, if only a quarter of the configured REs are transmitted, then the OOS threshold is lowered by a factor of 4 as to avoid over triggering OOS indication due to a partial RLM-RS.

Figure 5:
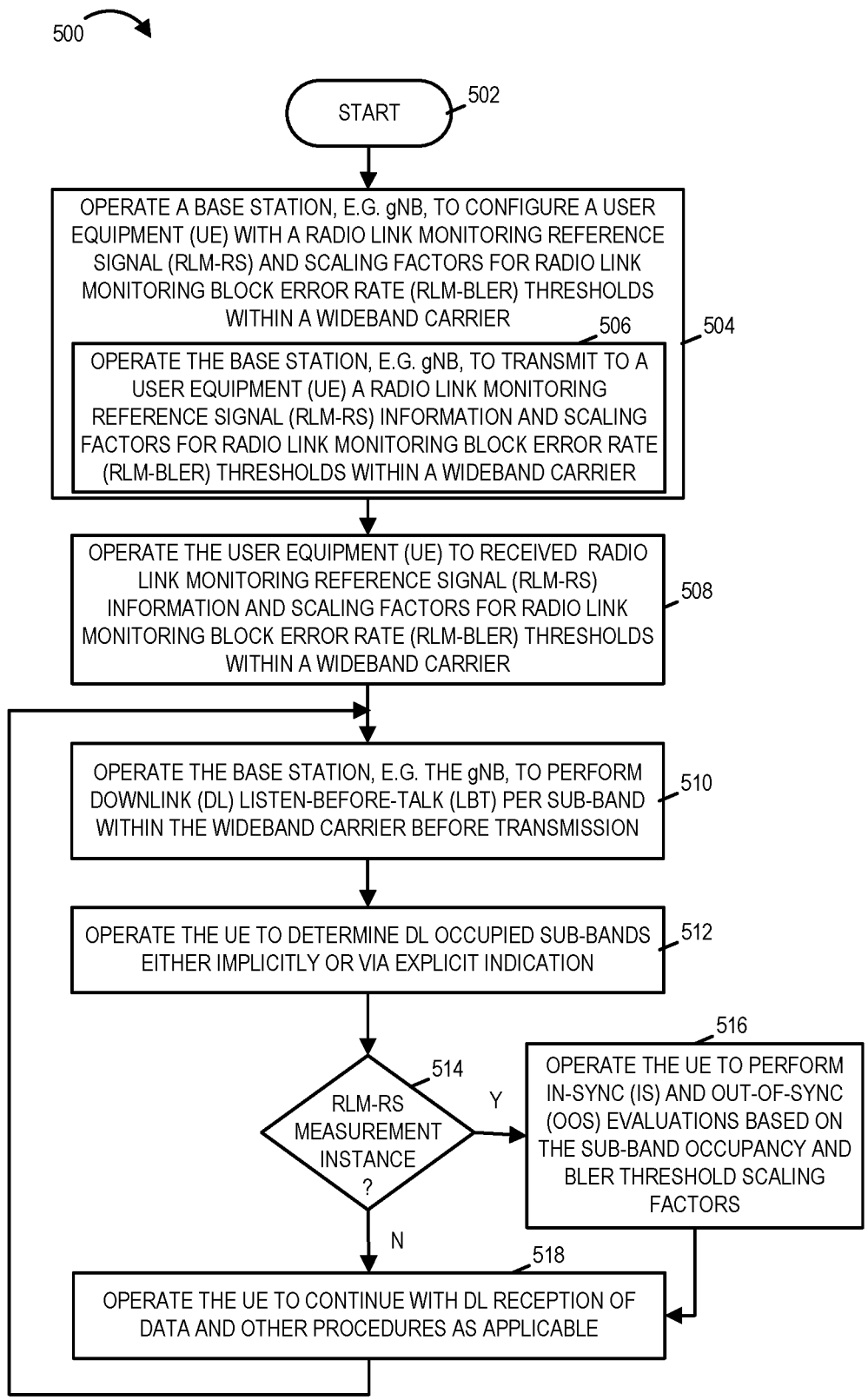
FIG. 5 is a flowchart of an exemplary method of operating a communications system in accordance with an exemplary embodiment.

FIG. 5 is a flowchart 500 of an exemplary method of operating a communications system, e.g., communications system 100 of FIG. 1, in accordance with an exemplary embodiment. Operation of the exemplary method starts in step 502, in which the communications system is powered on and initialized. Operation proceeds from start step 502 to step 504. In step 504, a base station, e.g., a gNB, is operated to configure a user equipment (UE) with radio link monitoring reference signal (RLM-RS) information and scaling factors for radio link monitoring block error rate (RLM-BLER) thresholds within a wideband carrier. Step 504 includes step 506. In step 506, the base station, e.g., a gNB, is operated to transmit to a user equipment (UE) radio link monitoring reference signal (RLM-RS) information and scaling factors for radio link monitoring block error rate (RLM-BLER) thresholds within a wideband carrier. The base station is, e.g., base station 1 104 of system 100 of FIG. 1, and the UE is, e.g., UE 1 110 of FIG. 1. Operation proceeds from step 504 to step 508.

In step 508 the UE is operated to receive from the base station radio link monitoring reference signal (RLM-RS) information and scaling factors for radio link monitoring block error rate (RLM-BLER) thresholds within a wideband carrier. Operation proceeds from step 508 to step 510.

In a step 510 the base station performs downlink (DL) listen-before-talk (LBT) per sub-band within the wideband carrier before transmission. Operation proceeds from step 510 to step 512.

In step 512 the UE determines DL occupied sub-bands either implicitly or via explicit indication. Operation proceeds from step 512 to step 514.

In step 514 the UE determines if a RLM-RS measurement instance is occurring. If the UE determines that a RLM-RS measurement instance is occurring, then operation proceeds from step 514 to step 516, in which the UE performs IN-SYNC (IS) and OUT-OF-SYNC (OOS) evaluations based on the sub-band occupancy and BLER threshold scaling factors. Operation proceeds from step 516 to step 518. If the UE determines in step 514 that a RLM-RS measurement instance is not occurring, then operation proceeds from step 514 to step 518.

In step 518 the UE is operated to continue with DL reception of data and other procedures as applicable. Operation proceeds from step 518 to step 510.

Figure 6:
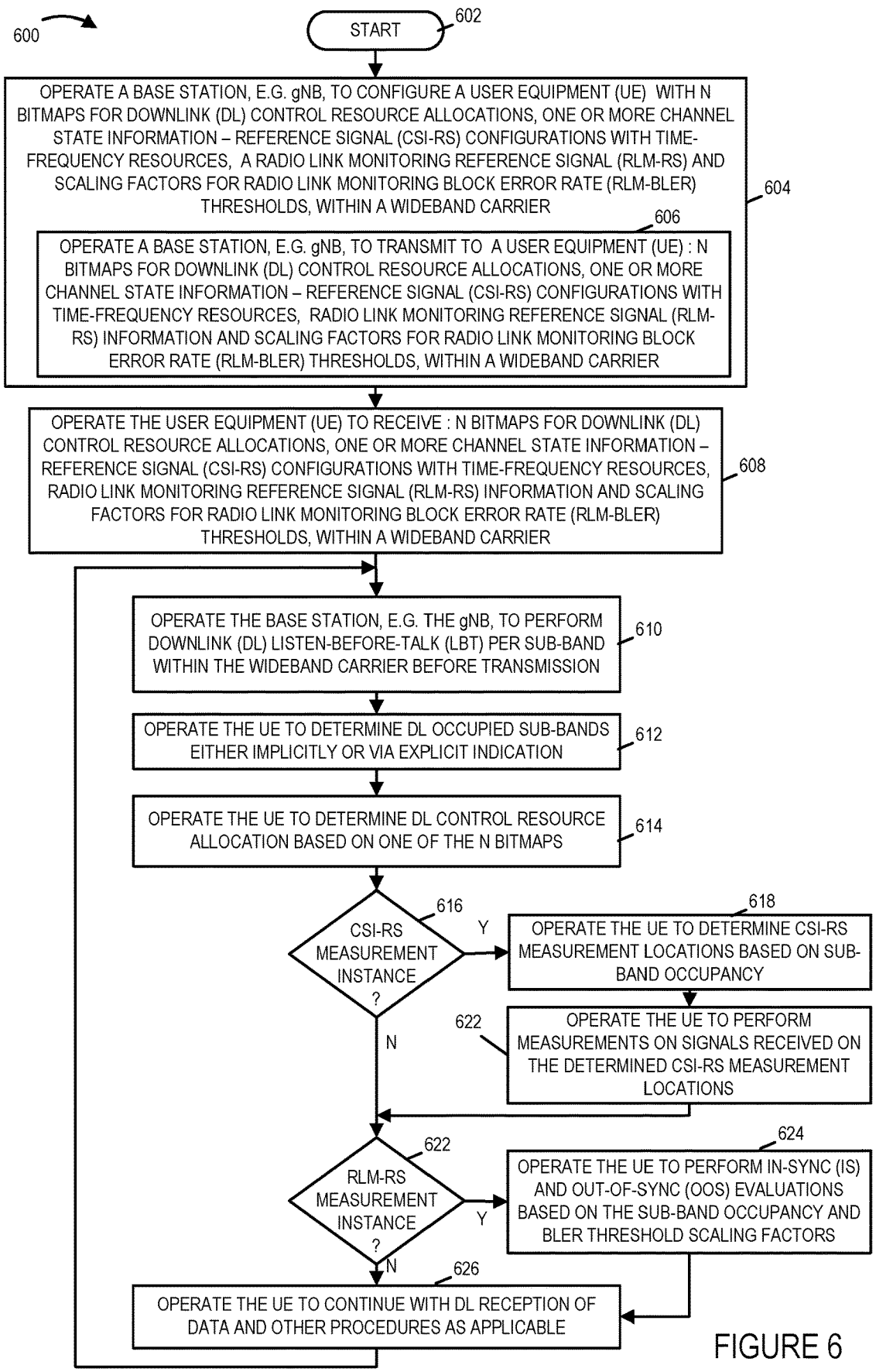
FIG. 6 is a flowchart of an exemplary method of operating a communications system in accordance with an exemplary embodiment.

FIG. 6 is a flowchart 600 of an exemplary method of operating a communications system, e.g., communications system 100 of FIG. 1, in accordance with an exemplary embodiment. Operation of the exemplary method starts in step 602, in which the communications system is powered on and initialized. The exemplary flowchart 600 of FIG. 6 includes novel features included in the exemplary flowcharts of FIG. 3, FIG. 4, and FIG. 5. Operation proceeds from start step 602 to step 604. In step 604, a base station, e.g., a gNB, is operated to configure a user equipment (UE) with: i) N bitmaps for downlink (DL) control resource allocations, ii) one or more channel state information-reference signal (CSI-RS) configurations with time-frequency resources, and iii) radio link monitoring reference signal (RLM-RS) information and scaling factors for radio link monitoring block error rate (RLM-BLER) thresholds, within a wideband carrier. Step 604 includes step 606, in which the base station, e.g., a gNB, is operated to transmit to the user equipment (UE): i) N bitmaps for downlink (DL) control resource allocations, ii) one or more channel state information-reference signal (CSI-RS) configurations with time-frequency resources, and iii) radio link monitoring reference signal (RLM-RS) information and scaling factors for radio link monitoring block error rate (RLM-BLER) thresholds, within a wideband carrier. The base station is, e.g., base station 1 104 of system 100 of FIG. 1, and the UE is, e.g., UE 1 110 of FIG. 1. Operation proceeds from step 606 to step 608.

In step 608, UE is operated to receive: i) N bitmaps for downlink (DL) control resource allocations, ii) one or more channel state information-reference signal (CSI-RS) configurations with time-frequency resources, and iii) radio link monitoring reference signal (RLM-RS) information and scaling factors for radio link monitoring block error rate (RLM-BLER) thresholds, within a wideband carrier. Operation proceeds from step 608 to step 610.

In a step 610 the base station performs downlink (DL) listen-before-talk (LBT) per sub-band within the wideband carrier before transmission. Operation proceeds from step 610 to step 612.

In step 612 the UE determines DL occupied sub-bands either implicitly or via explicit indication. Operation proceeds from step 612 to step 614. In step 614 the UE determines DL control resource allocation based on one of the N bitmaps. Operation proceeds from step 614 to step 616.

In step 616 the UE determines if a CSI-RS measurement instance is occurring. If the UE determines that a CSI-RS measurement instance is occurring, then operation proceeds from step 616 to step 618, in which the UE determines the CSI-RS measurement locations based on sub-band occupancy. Operation proceeds from step 618 to step 620. In step 620 the UE performs measurements on signal received on the determined CSI-RS measurement locations. Operation proceeds from step 620 to step 622.

Returning to step 616, if the UE determines in step 616 that a CSI-RS measurement instance is not occurring, then operation proceeds from step 616 to step 622.

In step 622 the UE determines if a RLM-RS measurement instance is occurring. If the UE determines that a RLM-RS measurement instance is occurring, then operation proceeds from step 622 to step 624, in which the UE performs IN-SYNC (IS) and OUT-OF-SYNC (OOS) evaluations based on the sub-band occupancy and BLER threshold scaling factors. Operation proceeds from step 624 to step 626. If the UE determines in step 622 that a RLM-RS measurement instance is not occurring, then operation proceeds from step 622 to step 626.

In step 626 the UE is operated to continue with DL reception of data and other procedures as applicable. Operation proceeds from step 626 to step 610.

Figure 7:
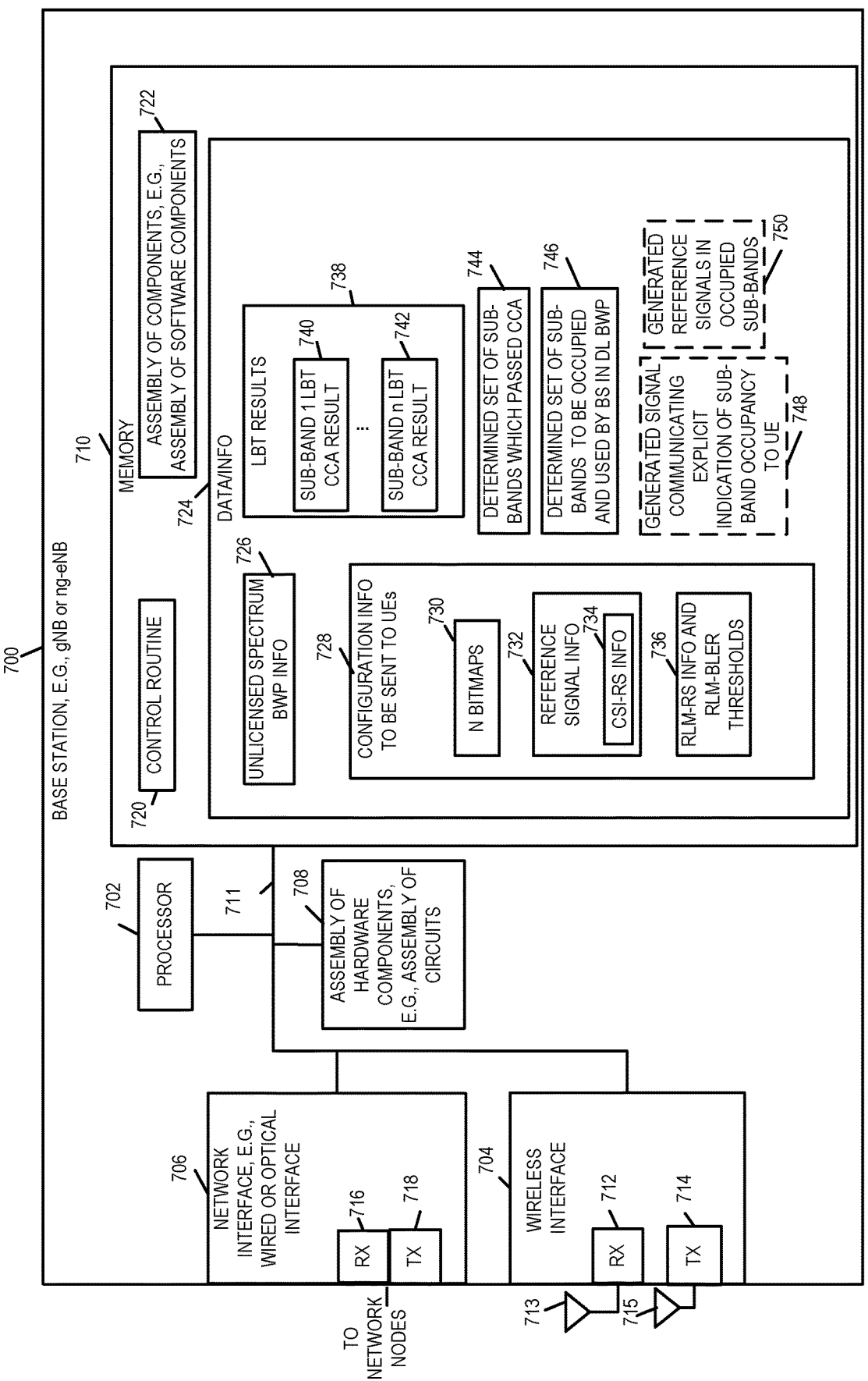
FIG. 7 is a drawing of an exemplary base station, e.g., a gNB or ng-eNB, in accordance with an exemplary embodiment.

FIG. 7 is a drawing of an exemplary base station 700, e.g., a gNB or ng-eNB, in accordance with an exemplary embodiment. In some embodiments, exemplary base station 700 of FIG. 7 implements: steps of the exemplary method of flowchart 300 of FIG. 3, steps of the exemplary method of flowchart 400 of FIG. 4, steps of the exemplary method of flowchart 500 of FIG. 5, steps of the exemplary method of flowchart 600 of FIG. 6, and/or steps of the exemplary method of flowchart 1100 of FIG. 11. Base station 700 is, e.g., any of base stations (base station 1 104, base station 2 106, ..., base station n 108) of FIG. 1.

Base station 700 includes a processor 702, e.g., a CPU, wireless interface 704, a network interface 706, e.g., a wired or optical interface, an assembly of hardware components 708, e.g., an assembly of circuits, and memory 710 coupled together via a bus 711 over which the various elements may interchange data and information.

Network interface 706 includes a receiver 716 and a transmitter 718. Network interface 706 to coupled to network nodes, e.g., via a backhaul network and/or the Internet. Wireless interface 704 includes a wireless receiver 712 and a wireless transmitter 714. The base station 700 receives signals from network devices, e.g. core network devices. Wireless receiver 712 is coupled to a receive antenna 713 via which the base station 700 can receive wireless signals, e.g., wireless signals from UE devices. Wireless transmitter 714 is coupled to a transmit antenna 715 via which the base station 700 can transmit wireless signals to UE devices.

Memory 710 includes a control routine 720, e.g., for controlling basic functions of the base station, an assembly of components 722, e.g., an assembly of software components, and data/information 724. Data/information 724 includes unlicensed spectrum bandwidth portion (BWP) information 726, and configuration information 728 to be sent to UEs. Configuration information 728 includes N bitmaps for downlink control resource allocations 726, reference signal information 732 including channel state information-reference signal (CSI-RS) information 734, e.g. CSI-RS configurations with time-frequency resources, and radio link monitoring reference signal (RLM-RS) information and scaling factors for RLM-Block Error Rate (BLER) thresholds 736. Data/information 724 further includes listen-before-talk (LBT) results 738. LBT results 738 includes a plurality of LBT channel clear assessment results, one for each sub-band of the BWP (sub-band 1 LBT CCA result 740, ..., LBT sub-band n CCA result 742). Data/information 724 further includes a determined set of sub-bands which has passed CCA 744, and a determined set of sub-bands to be occupied and used by the base station for communicating data and information to UEs in the BL BWP. Data/information 724 includes one or both of: a generated signal 748 communicating explicit sub-band occupancy information to be communicated to the UE and generated reference signals to be transmitted to one or more UEs on occupied sub-bands 750.

Figure 8:
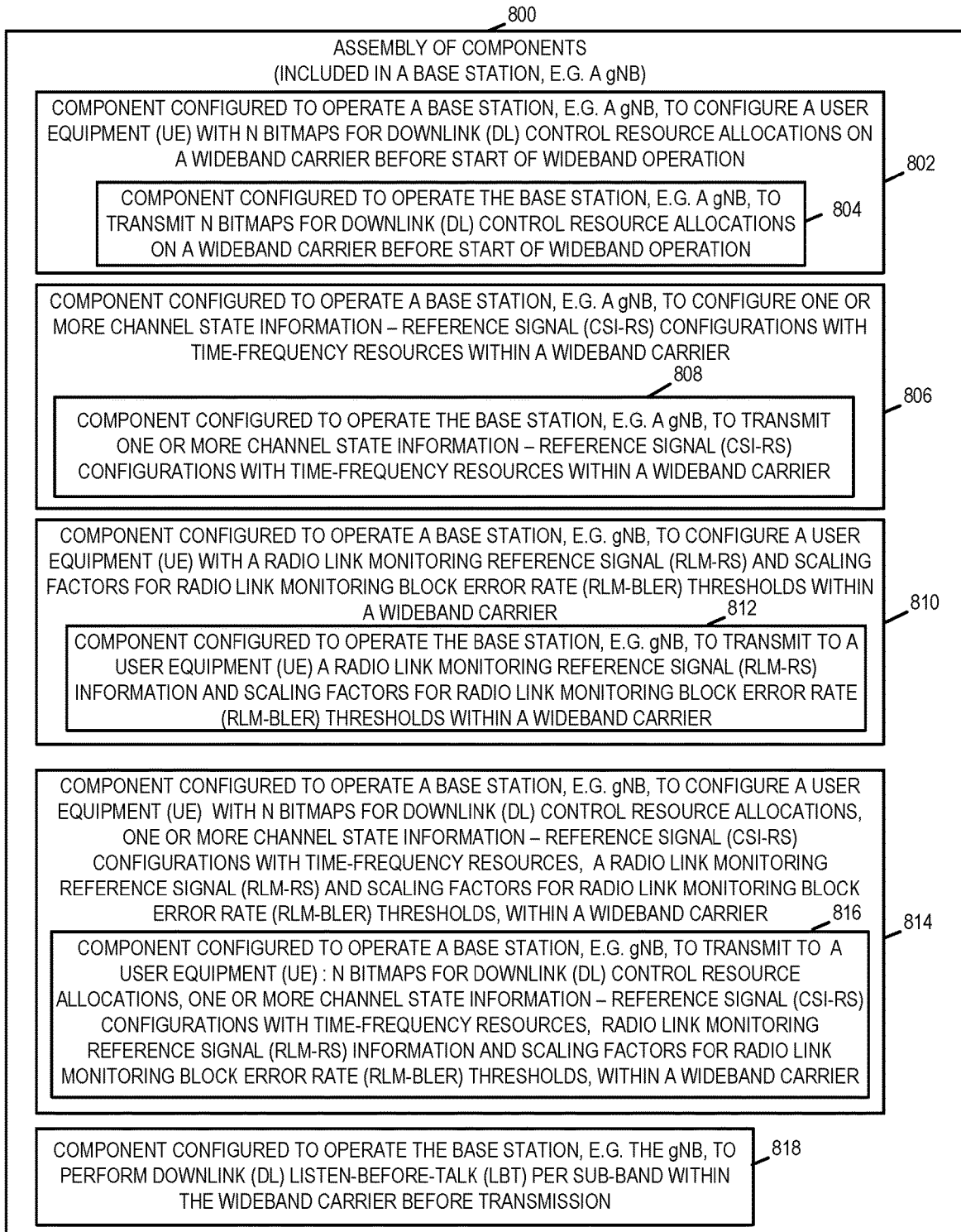
FIG. 8 is a drawing of an exemplary assembly of components which may be included in an exemplary base station, e.g., a gNB or ng-eNB, in accordance with an exemplary embodiment.

FIG. 8 is a drawing of an exemplary assembly of components 800, in accordance with an exemplary embodiment. Exemplary assembly of components 800 which may be included in a base station, e.g., a gNB or an ng-eNB, such as the exemplary base station 700, e.g., a gNB or ng-eNB, of FIG. 7, and implement steps of an exemplary method, e.g., steps of the method of the flowchart 300 of FIG. 3, steps of the method of the flowchart 400 of FIG. 4, steps of the method of the flowchart 500 of FIG. 5, and/or steps of the method of the flowchart 600 of FIG. 6.

Assembly of components 800 can be, and in some embodiments is, used in base station 700, e.g., a gNB or ng-eNB, of FIG. 7, base station 1 104 of FIG. 1, base station 2 106 of FIG. 1 and/or base station n 108 of FIG. 1. The components in the assembly of components 800 can, and in some embodiments are, implemented fully in hardware within the processor 702, e.g., as individual circuits. The components in the assembly of components 800 can, and in some embodiments are, implemented fully in hardware within the assembly of components 708, e.g., as individual circuits corresponding to the different components. In other embodiments some of the components are implemented, e.g., as circuits, within the processor 702 with other components being implemented, e.g., as circuits within assembly of components 708, external to and coupled to the processor 702. As should be appreciated the level of integration of components on the processor and/or with some components being external to the processor may be one of design choice. Alternatively, rather than being implemented as circuits, all or some of the components may be implemented in software and stored in the memory 710 of the base station 700, e.g., a gNB or ng-eNB, with the components controlling operation of the base station to implement the functions corresponding to the components when the components are executed by a processor, e.g., processor 702. In some such embodiments, the assembly of components 800 is included in the memory 710 as assembly of components 722. In still other embodiments, various components in assembly of components 800 are implemented as a combination of hardware and software, e.g., with another circuit external to the processor 702 providing input to the processor 702 which then under software control operates to perform a portion of a component's function. While processor 702 is shown in the FIG. 7 embodiment as a single processor, e.g., computer, it should be appreciated that the processor 702 may be implemented as one or more processors, e.g., computers.

When implemented in software the components include code, which when executed by the processor 702, configure the processor 702 to implement the function corresponding to the component. In embodiments where the assembly of components 800 is stored in the memory 710, the memory 710 is a computer program product comprising a computer readable medium comprising code, e.g., individual code for each component, for causing at least one computer, e.g., processor 702, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 8 control and/or configure the base station 700, or elements therein such as the processor 702, to perform the functions of corresponding steps illustrated and/or described in the method of one or more of the flowcharts, signaling diagrams and/or described with respect to any of the Figures. Thus the assembly of components 800 includes various components that perform functions of corresponding one or more described and/or illustrated steps of an exemplary method, e.g., steps of: the method of flowchart 300 of FIG. 3, the method of flowchart 400 of FIG. 4, the method of flowchart 400 of FIG. 5, and/or the method the method of flowchart 600 of FIG. 6 and/or described or shown with respect to any of the other figures.

Assembly of components 800 includes a component 802 configured to operate a base station, e.g., a gNB, to configure a user equipment (UE) with N bitmaps for downlink (DL) control resource allocation on a wideband before start of wideband operation. Component 802 includes a component 804 configured to operate the base station, e.g., gNB, to transmit, e.g., to the UE, N bitmaps for downlink control resource allocations on a wideband carrier before start of wideband operation.

Assembly of components 800 further includes a component 806 configured to operate a base station, e.g. a gNB, to configure a UE with one or more channel state information-reference signal (CSI-RS) configurations with time frequency resources within a wideband carrier. Component 806 includes a component 808 configured to operate the base station, e.g., gNB, to transmit to the UE one or more channel state information-reference signal (CSI-RS) configurations with time-frequency resources within a wideband carrier.

Assembly of components 800 further includes a component 810 configured to operate a base station, e.g. a gNB, to configure a UE with radio link monitoring reference signal (RLM-RS) information and scaling factors for radio link monitoring block error rate (RLM-BLER) thresholds within a wideband carrier. Component 810 includes a component 812 configured to operate the base station, e.g. gNB to transmit to a UE radio link monitoring reference signal (RLM-RS) information and scaling factors for radio link monitoring block error rate (RLM BLER) thresholds within a wideband carrier.

Assembly of components 800 further includes a component 814 configured to operate a base station, e.g. a gNB, to configure a UE with: N bitmaps for downlink (DL) control resource allocation, one or more channel state information-reference signal (CSI-RS) configurations with time frequency resources, and radio link monitoring reference signal (RLM-RS) information and scaling factors for radio link monitoring block error rate (RLM-BLER) thresholds, within a wideband carrier. Component 814 includes a component 816 configured to operate the base station, e.g. gNB to transmit to a UE: N bitmaps for downlink (DL) control resource allocation, one or more channel state information-reference signal (CSI-RS) configurations with time frequency resources, and radio link monitoring reference signal (RLM-RS) information and scaling factors for radio link monitoring block error rate (RLM-BLER) thresholds, within a wideband carrier.

Assembly of components 800 further includes a component 818 configured to perform downlink (DL) listen-before-talk (LBT) per sub-band with the wideband carrier before transmission.

Figure 9:
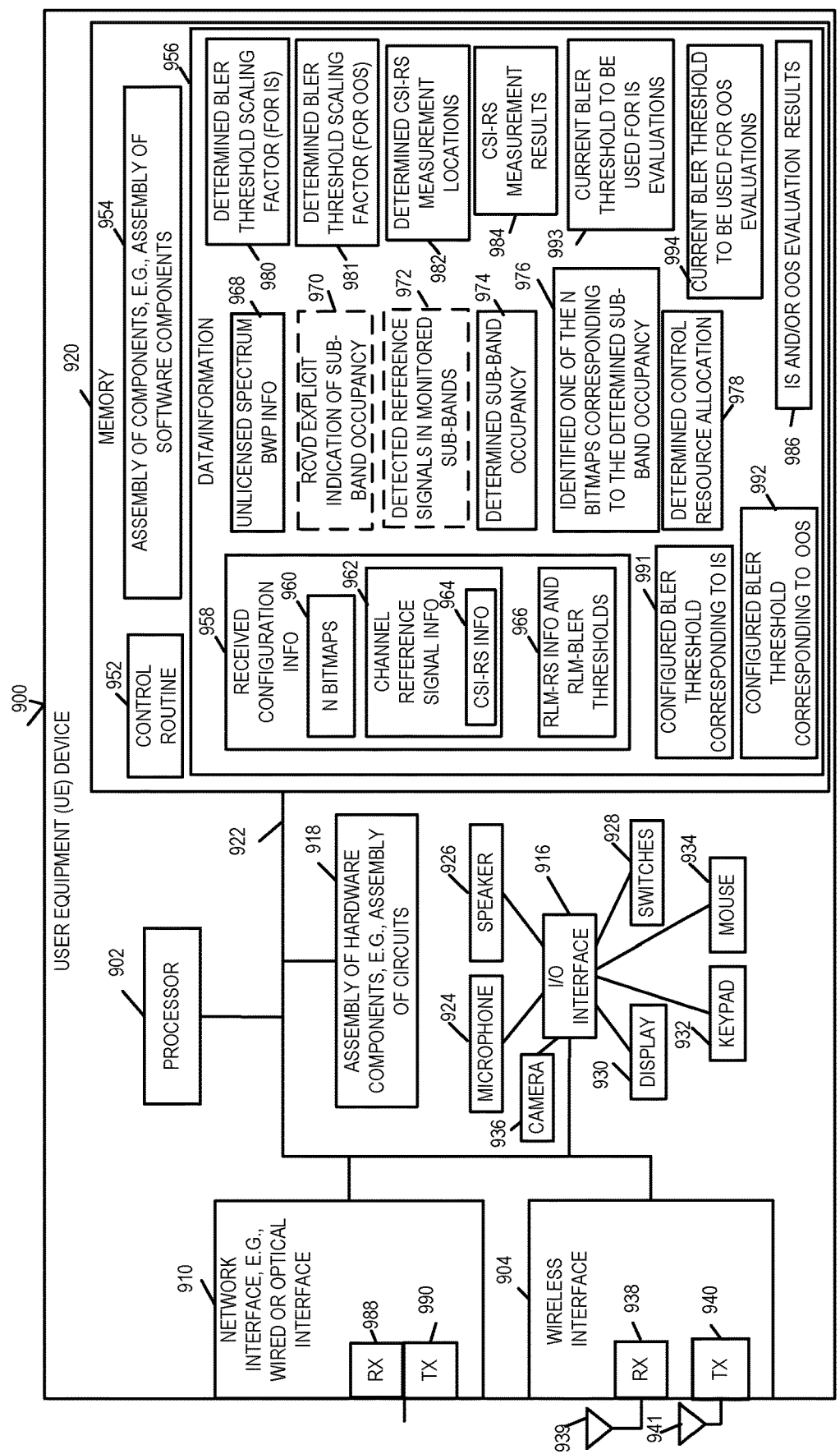
FIG. 9 is a drawing of an exemplary user equipment (UE) device implemented in accordance with an exemplary embodiment.

FIG. 9 is a drawing of an exemplary user equipment (UE) device 900 implemented in accordance with an exemplary embodiment. UE device 900 is, e.g. one of the UE devices (110, 112, 114, 116, 118, 120, 122) of system 100 of FIG. 1. UE device 900 includes a processor 902, a wireless interface 904, a network interface 910, an I/O interface 916, an assembly of hardware components 918, e.g., an assembly of circuits, and memory 920 coupled together via a bus 922 over which the various elements may interchange data and information. Wireless interface 904 includes a wireless receiver 938 coupled to receive antenna 939, via which the UE may receive wireless signals, e.g., wireless downlink signals from a base station, e.g., a gNB. Wireless interface 904 includes a wireless transmitter 940 coupled to transmit antenna 941, via which the UE may transmit wireless signals, e.g., wireless uplink signals to a base station, e.g., a gNB. Network interface 910, e.g., a wired or optical interface 910 includes a receiver 988 and a transmitter 990.

UE device 900 further includes a microphone 924, a speaker 926, switches 928, a mouse 934, a keypad 932, a display 930 and a camera 936 coupled to I/O interface 916, via which the various input/output devices (924, 926, 928, 930, 932, 934, 936) may communicate with the other elements (902, 904, 910, 918, 920) of the UE device. Memory 920 includes a control routine 952, an assembly of components 954, e.g., an assembly of software components, and data/information 956.

Data/information 956 includes received configuration information from a base station 958. Received configuration information 958 includes N bitmaps for downlink control resource allocations 960, reference signal information 962 including channel state information-reference signal (CSI-RS) information 964, e.g. CSI-RS configurations with time-frequency resources, and radio link monitoring reference signal (RLM-RS) information and scaling factors for RLM-Block Error Rate (BLER) thresholds 966. Data/information further includes a configured BLER threshold corresponding to in-sync 991, a configured BLER threshold corresponding to out-of-sync 992. Data/information 956 further includes unlicensed spectrum bandwidth portion (BWP) information 968, e.g., information identifying the frequency range of the BWP, information identifying each of the sub-bands within the bandwidth portion, timing structure information identifying time intervals for DL and time intervals for UL, and information identifying unlicensed spectrum which includes the BWP. Data/information 956 includes one or both of: a received explicit indication of sub-band occupancy 970, e.g., a received signal from the base station identifying which sub-bands in the BWP passed DL CCA and are to be occupied to convey DL signals to the UE in the DL BWP signal burst, and detected reference signals in monitored sub-bands 972, e.g. to be used by the UE to determine sub-band occupancy. Data/information 956 further includes determined sub-band occupancy 974, an identified one of the N bitmaps corresponding to the determined sub-band occupancy 976, determined control resource allocation 978 based on information included in the identified one of the N bitmaps, a determined BLER threshold scaling factor (in-sync) 980, e.g., determined based on the number of sub-bands which are determined to be occupied in the DL BWP, a determined BLER threshold scaling factor (out-of-sync) 981, e.g., determined based on the number of sub-bands which are determined to be occupied in the DL BWP, determined CSI-RS measurement locations 982, and CSI-RS measurement results 984. Data/information 956 further includes a current BLER threshold to be used for in-sync (IS) evaluations 993, e.g., threshold 991 multiplied by scaling factor 980, a current BLER threshold to be used for out-of-sync evaluations 994, e.g., threshold 992 multiplied by scaling factor 981, and in-sync (IN) and/or out-of-sync (OOS) evaluation results 986.

Figure 10:
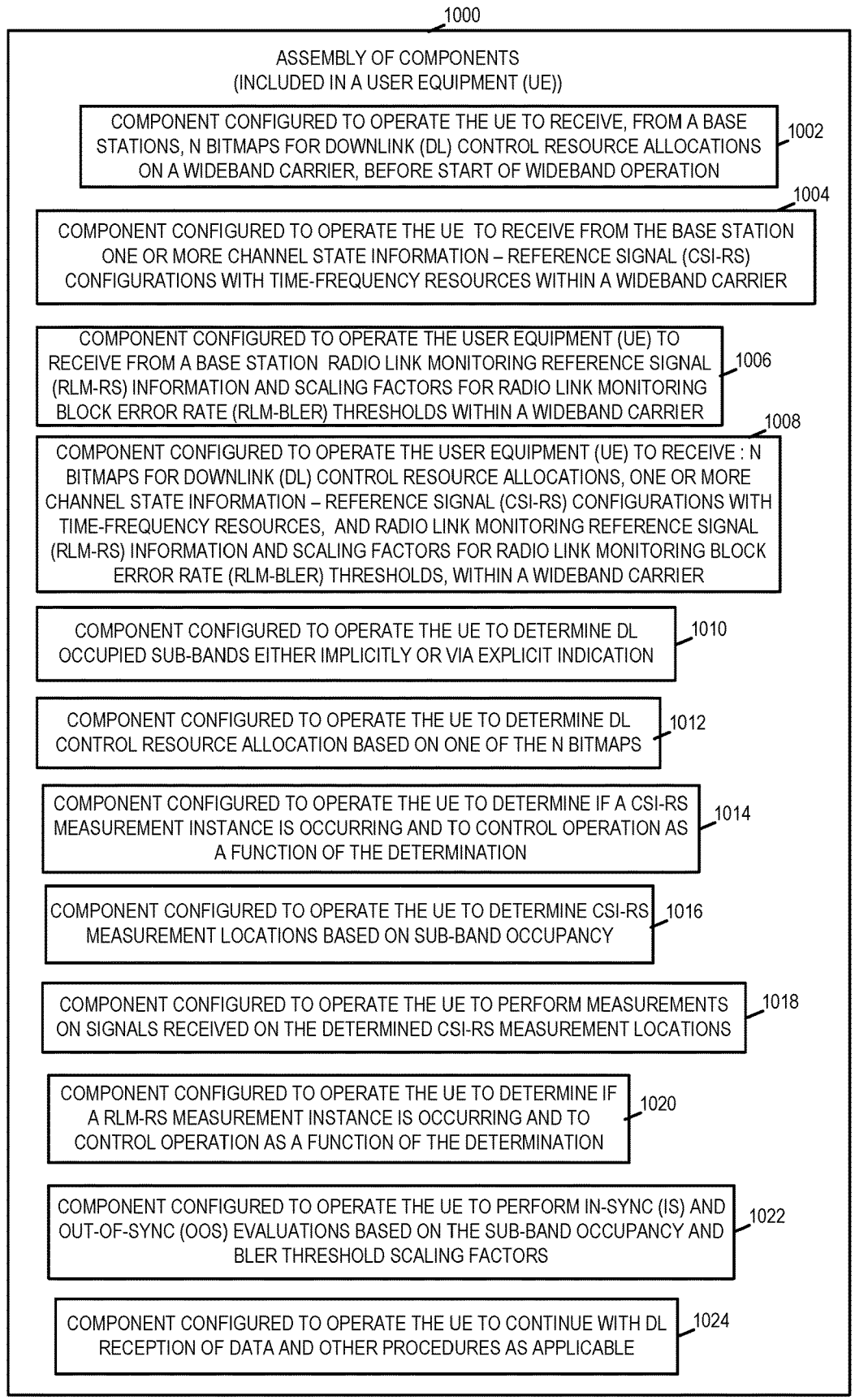
FIG. 10 is a drawing of an exemplary assembly of components which may be included in an exemplary user equipment (UE) device in accordance with an exemplary embodiment.

FIG. 10 is a drawing of an exemplary assembly of components 1000, in accordance with an exemplary embodiment. Exemplary assembly of components 1000 which may be included in a user equipment (UE) device, e.g., UE device 900 of FIG. 9, and implement steps of an exemplary method, e.g., steps of the method of the flowchart 300 of FIG. 3, steps of the method of the flowchart 400 of FIG. 4, steps of the method of the flowchart 500 of FIG. 5, and/or steps of the method of the flowchart 600 of FIG. 6.

Assembly of components 1000 can be, and in some embodiments is, used in UE device 900 of FIG. 9, or any of the UEs of FIG. 1, e.g. UE 110 of FIG. 1. The components in the assembly of components 1000 can, and in some embodiments are, implemented fully in hardware within the processor 902, e.g., as individual circuits. The components in the assembly of components 1000 can, and in some embodiments are, implemented fully in hardware within the assembly of components 918, e.g., as individual circuits corresponding to the different components. In other embodiments some of the components are implemented, e.g., as circuits, within the processor 902 with other components being implemented, e.g., as circuits within assembly of components 918, external to and coupled to the processor 902. As should be appreciated the level of integration of components on the processor and/or with some components being external to the processor may be one of design choice. Alternatively, rather than being implemented as circuits, all or some of the components may be implemented in software and stored in the memory 920 of the UE device 900, with the components controlling operation of the UE device to implement the functions corresponding to the components when the components are executed by a processor, e.g., processor 902. In some such embodiments, the assembly of components 1000 is included in the memory 9200 as assembly of components 954. In still other embodiments, various components in assembly of components 1000 are implemented as a combination of hardware and software, e.g., with another circuit external to the processor 902 providing input to the processor 902 which then under software control operates to perform a portion of a component's function. While processor 902 is shown in the FIG. 9 embodiment as a single processor, e.g., computer, it should be appreciated that the processor 902 may be implemented as one or more processors, e.g., computers.

When implemented in software the components include code, which when executed by the processor 902, configure the processor 902 to implement the function corresponding to the component. In embodiments where the assembly of components 1000 is stored in the memory 920, the memory 920 is a computer program product comprising a computer readable medium comprising code, e.g., individual code for each component, for causing at least one computer, e.g., processor 902, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 10 control and/or configure the UE 900, or elements therein such as the processor 902, to perform the functions of corresponding steps illustrated and/or described in the method of one or more of the flowcharts, signaling diagrams and/or described with respect to any of the Figures. Thus the assembly of components 1000 includes various components that perform functions of corresponding one or more described and/or illustrated steps of an exemplary method, e.g., steps of: the method of flowchart 300 of FIG. 3, the method of flowchart 400 of FIG. 4, the method of flowchart 400 of FIG. 5, and/or the method the method of flowchart 600 of FIG. 6 and/or described or shown with respect to any of the other figures.

Assembly of components 1000 includes a component 1002 configured to operate the UE to receive, from a base station, N bitmaps for downlink (DL) control resource allocations on a wideband carrier before start of wideband operation, a component 1004 configured to operate the UE to receive, from a base station, one or more channel state information-reference signal (CSI-RS) configurations with time-frequency resources within a wideband carrier, a component 1006 configured to operate the UE to receive from a base station radio link monitoring reference signal (RLM-RS) information and scaling factors for radio link monitoring block error rate (RLM-BLER) thresholds, within a wideband carrier, and a component 1008 configured to operate the UE to receive, e.g., from a base station, N bitmaps for downlink (DL) control resource allocations, one or more channel state information-reference signal (CSI-RS) configurations with time-frequency resources, and radio link monitoring reference signal (RLM-RS) information and scaling factors for radio link monitoring block error rate (RLM-BLER) thresholds, within a wideband carrier.

Assembly of components 1000 further includes a component 1010 configured to operate the UE to determine DL occupied sub-bands either implicitly or via explicit indication, a component 102 configured to operate the UE to determine DL control resource allocation based on one of the N bitmaps, e.g., the bitmap which corresponds to the determined DL occupied sub-bands, a component 1014 configured to operate the UE to determine if a CSI-RS measurement instance is occurring, e.g., in accordance with a predetermined timing structure, and to control operation as a function of the determination, a component 1016 configured to operate the UE to determine CSI-RS measurement locations based on sub-band occupancy, a component 1018 configured to operate the UE to perform measurements on signals received on the determined CSI-RS measurement locations, a component 1020 configured to operate the UE to determine if a RLM-RS measurement instance is occurring, e.g., in accordance with a predetermined timing structure, and to control operation as a function of the determination, a component 1022 configured to operate the UE to perform in-sync (IS) and out-of-sync (OOS) evaluations based on the determined sub-band occupancy and a determined BLER threshold scaling factor, and a component 1024 configured to operate the UE to continue with DL reception and other procedures as applicable.

Figure 11A:
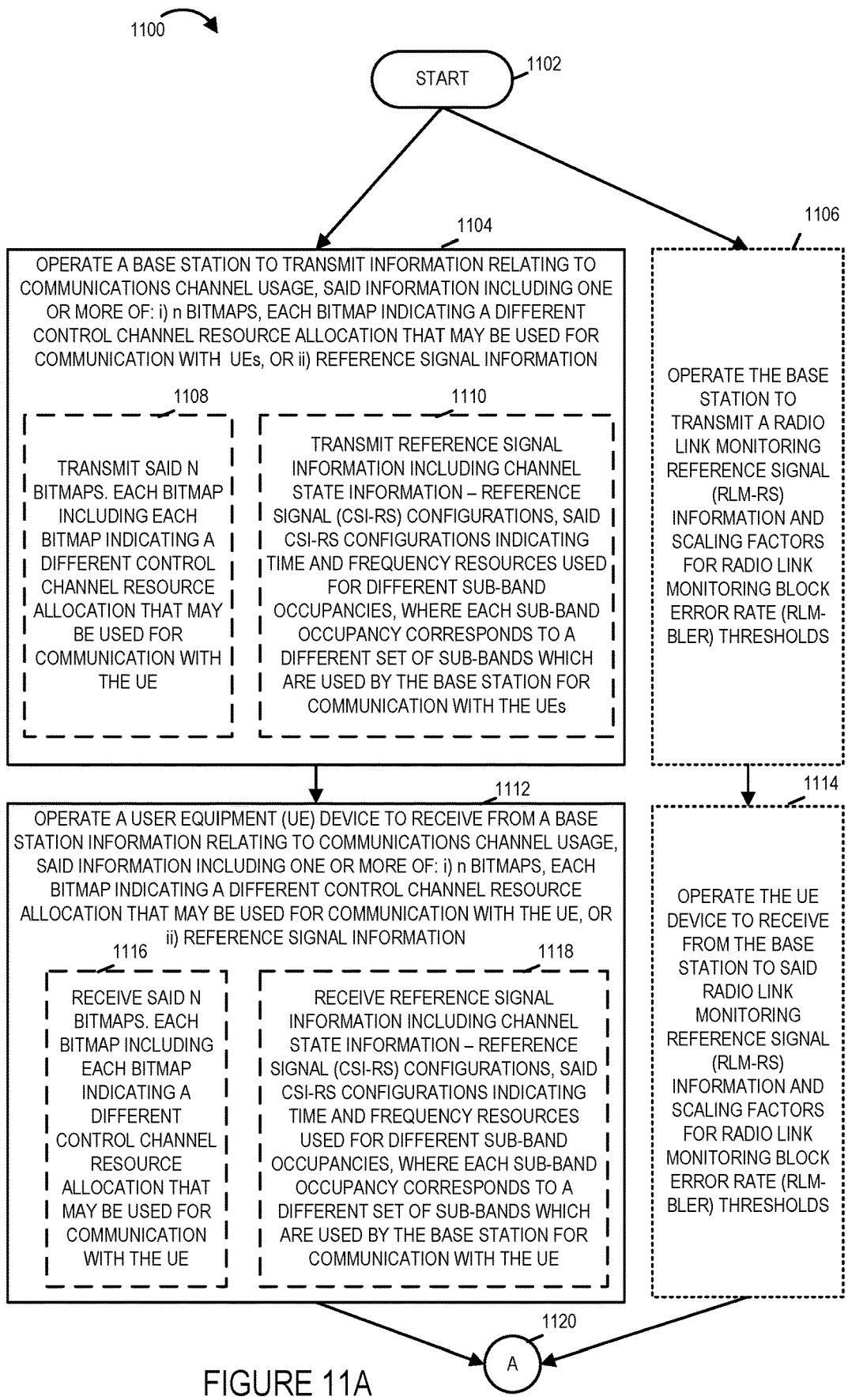
FIG. 11A is a first part of a flowchart of an exemplary method in accordance with an exemplary embodiment.
Figure 11B:
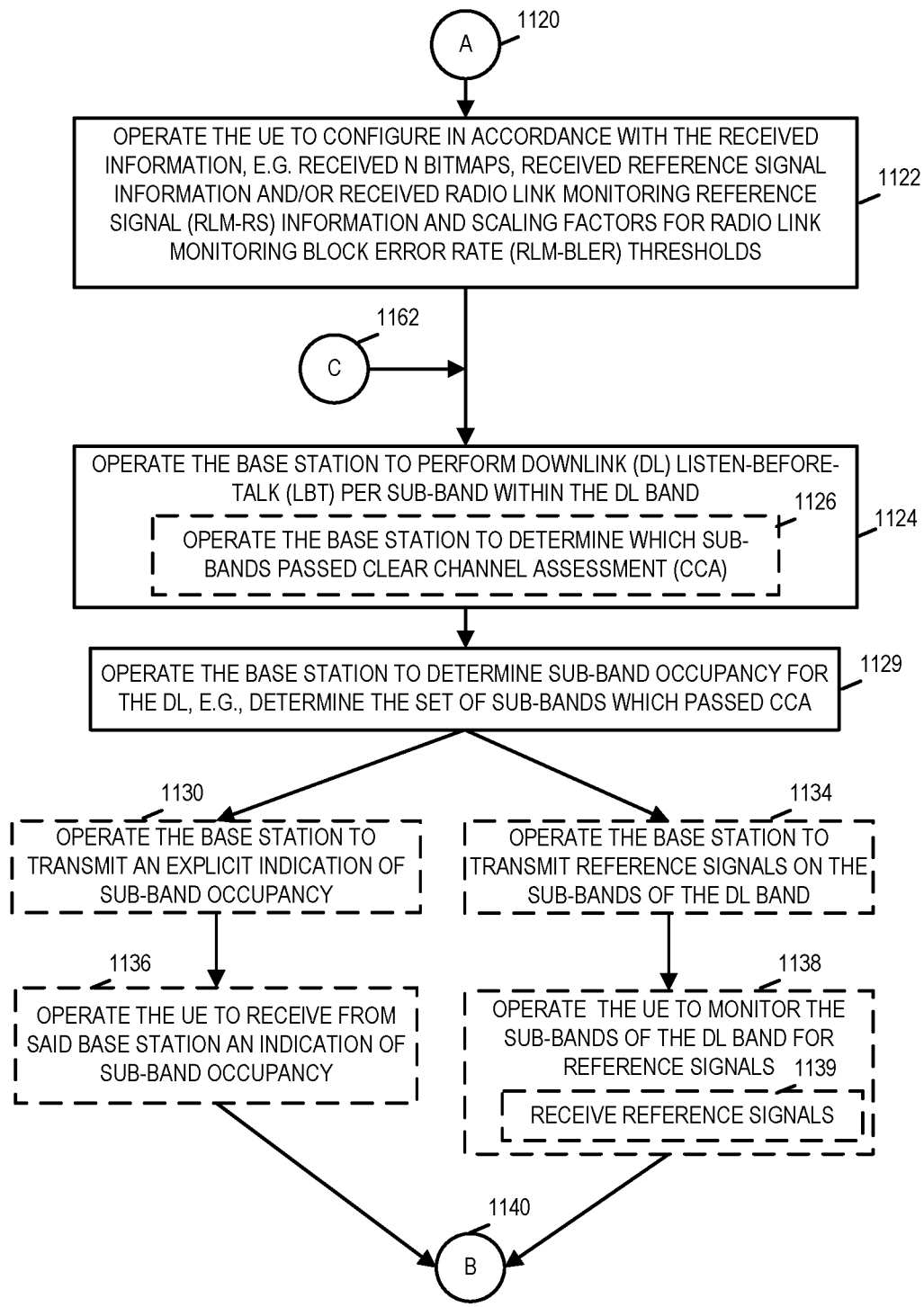
FIG. 11B is a second part of a flowchart of an exemplary method in accordance with an exemplary embodiment.
Figures 11, 11A, 11B, 11C:
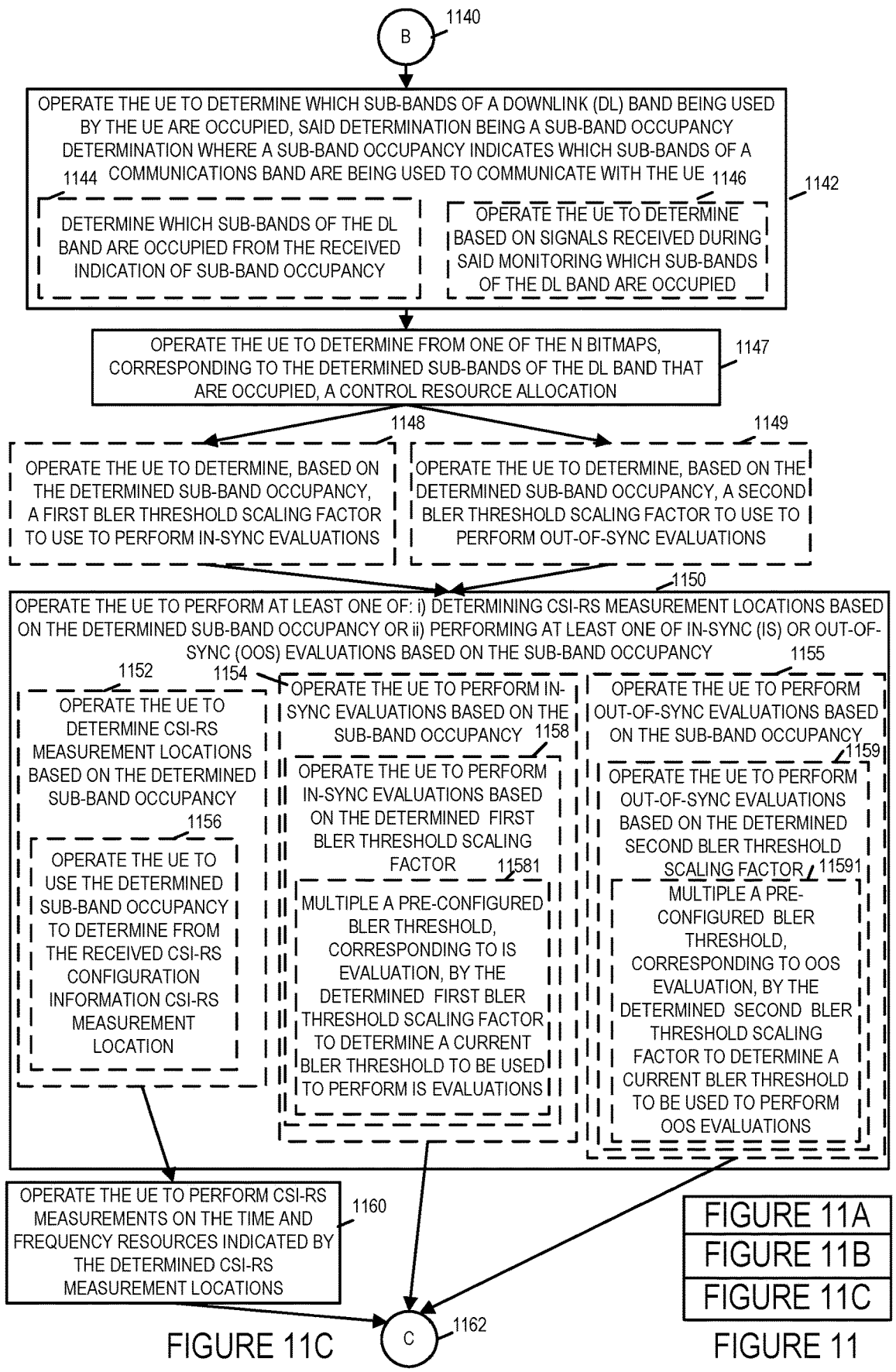
FIG. 11C is a third part of a flowchart of an exemplary method in accordance with an exemplary embodiment.
FIG. 11 comprises the combination of FIG. 11A, FIG. 11B and FIG. 11C.

FIG. 11, comprising the combination of FIG. 11A, FIG. 11B and FIG. 11C, is a flowchart 1100 of an exemplary method of operation a communications system in accordance with an exemplary embodiment. Operation starts in step 1102 in which the communications system is powered on and initialized. Operation proceeds from start step 1102 to step 1104, and in some embodiments, to step 1106.

In step 1104, a base station, e.g. base station 104 of system 100 of FIG. 1, transmits information relating to communications channel usage, said information including one or more of N bitmaps, each bitmap indicating a different control channel resource allocation that may be used for communications with UEs, or ii) reference signal information. Step 1104 includes one or both of steps 1108 and 1110. In step 1108 the base station transmits said N bitmaps, each bitmap indicating a different control channel resource allocation that may be used for communications with the UE. In step 1110 the base station transmits reference signal information including channel state information-reference signal (CSI-RS) configurations, said CSI-RS configurations indicating time and frequency resources used for different sub-band occupancies, where each sub-band occupancy corresponds to a different set of sub-bands which are used by the base station for communication with the UEs.

In step 1106 the base station transmits radio link monitoring reference signal (RLM-RS) information and scaling factors for radio link monitoring block error rate (RLM-BLER) thresholds.

Operation proceeds from step 1104 to step 1112. Operation proceeds from step 1106 to step 1114.

In step 1112 a UE device, e.g., UE 110 of system 100 of FIG. 1, receives from the base station information relating to communications channel usage, said information including one or more of N bitmaps, each bitmap indicating a different control channel resource allocation that may be used for communications with UEs, or ii) reference signal information. Step 1112 includes one or both of steps 1116 and 1118. In step 1116 the UE device receives said N bitmaps, each bitmap indicating a different control channel resource allocation that may be used for communications with the UE. In step 1118 the UE receives reference signal information including channel state information-reference signal (CSI-RS) configurations, said CSI-RS configurations indicating time and frequency resources used for different sub-band occupancies, where each sub-band occupancy corresponds to a different set of sub-bands which are used by the base station for communication with the UE.

In step 1114 the UE receives radio link monitoring reference signal (RLM-RS) information and scaling factors for radio link monitoring block error rate (RLM-BLER) thresholds.

Operation proceeds from step 1112 and 1114, via connecting node A 1120 to step 1122. In step 1122 the UE is operated to configure in accordance with the received information, e.g. received N bitmaps, received reference signal information, and/or received radio link monitoring-reference signal (RLM-RS) information and scaling factors for radio link monitoring block error rate (RLM-BLER) thresholds. Operation proceeds from step 1122 to step 1124.

In step 1124 the base station performs downlink (DL) listen-before-talk (LBT) per sub-band within the DL band. Step 1124 includes step 1126. In step 1126 the base station determines which sub-bands passed clear channel assessment (CCA). Operation proceeds from step 1129 to one or both of step 1120 and step 1134.

In step 1130 the base station transmits an explicit indication of sub-band occupancy, e.g., an explicit indication as to which sub-bands passed CCA and are to be used (occupied) by the base station in a DL bandwidth portion burst. Operation proceeds from step 1130 to step 1136. In step 1136 the UE receives from the base station the indication, e.g., explication indication, of sub-band occupancy.

Returning to step 1134, in step 1134 the base station transmits reference signals on sub-bands of the DL band, e.g., on the sub-bands of the DL band which passed CCA. Operation proceeds from step 1134 to step 1138.

In step 1138 the UE monitors the sub-bands of the DL band for references signals. Step 1138 includes step 1139 in which the UE receives reference signals one or more sub-bands.

Operation proceeds from step 1136 and/or from step 1138, via connecting node B 1140, to step 1142. In step 1142 the UE determines which sub-bands of a downlink (DL) band being used by the UE are occupied, said determination being a sub-band occupancy determination where sub-band occupancy indicates which sub-bands are being used to communicate with the UE. In some embodiments, the sub-band occupancy determination is a dynamic sub-band occupancy determination. Step 1142 includes one of step 1144 and step 1146. In step 1146 the UE determines which sub-bands are occupied from the received indication of sub-band occupancy, e.g., from the received explicit indication of sub-band occupancy which was received in step 1136. In step 1146 the UE determines based on signal received, e.g., reference signals received in step 1139, during said monitoring which sub-bands of the downlink are occupied. Operation proceeds from step 1142 to step 1147.

In step 1147 the UE determines from one of the N bitmaps, corresponding to the determined sub-bands of the DL band that are occupied, a control resource allocation. In some embodiments, operation proceeds from step 1147 to one or both of step 1148 and step 1149; in other embodiments, operation proceeds from step 1147 to step 1150.

In step 1148 the UE determines, based on the determined sub-band occupancy, a first block error (BLER) threshold scaling factor to use to perform in-sync (IS) evaluations. Operation proceeds from step 1148 to step 1150.

In step 1149 the UE determines, based on the determined sub-band occupancy, a second block error (BLER) threshold scaling factor to use to perform out-of-sync (OSS) evaluations. Operation proceeds from step 1149 to step 1150.

In step 1150 the UE performs at least one of: determining CSI-RS measurement locations based on the determined sub-band occupancy or ii) performing at least one of in-sync (IS) or out-of-sync (OOS) evaluations based on the determined sub-band occupancy. Step 1150 includes one or more or all of steps 1152, step 1154 and step 1155.

In step 1152 the UE determines CSI-RS measurement locations based on the determined sub-band occupancy. Step 1152 includes step 1156 in which the UE uses the determined sub-band occupancy to determine from the received CSI-RS configuration information CSI-RS measurement locations. Operation proceeds from step 1152 to step 1160.

In step 1160 the UE performs CSI-RS measurements on the time and frequency resources indicated by the determined CSI-RS measurement locations.

Returning to step 1154, in step 1154 the UE performs in-sync (IS) evaluations based on the sub-band occupancy. Step 1154 includes step 1158 in which the UE is operated to perform in-sync evaluations based on the determined first BLER threshold scaling factor, e.g., the determined first BLER threshold scaling factor of step 1148. Step 1158 includes step 11581 in which the UE multiples a preconfigured BLER threshold corresponding to IS evaluation, by the determined first BLER threshold scaling factor to determine a current BLER threshold to be used to perform in-sync (IS) evaluations.

Returning to step 1155, in step 1155 the UE performs out-of-sync (OOS) evaluations based on the sub-band occupancy. Step 1155 includes step 1159 in which the UE is operated to perform out-of-sync (OOS) evaluations based on the determined second BLER threshold scaling factor, e.g., the determined second BLER threshold scaling factor of step 1149. Step 1159 includes step 11591 in which the UE multiples a pre-configured BLER threshold corresponding to OOS evaluation, by the determined second BLER threshold scaling factor to determine a current BLER threshold to be used to perform out-of-sync (OOS) evaluations.

Operation proceeds from step 1160, step 1154 and/or step 1155, via connecting node C 1162 to the input of step 1124.

Exemplary types of signals, e.g., types of reference signals and/or control signals, described with respect to any of FIG. 3-6 may be, and sometimes are, used with respect to the flowchart of FIG. 11.

Figure 12:
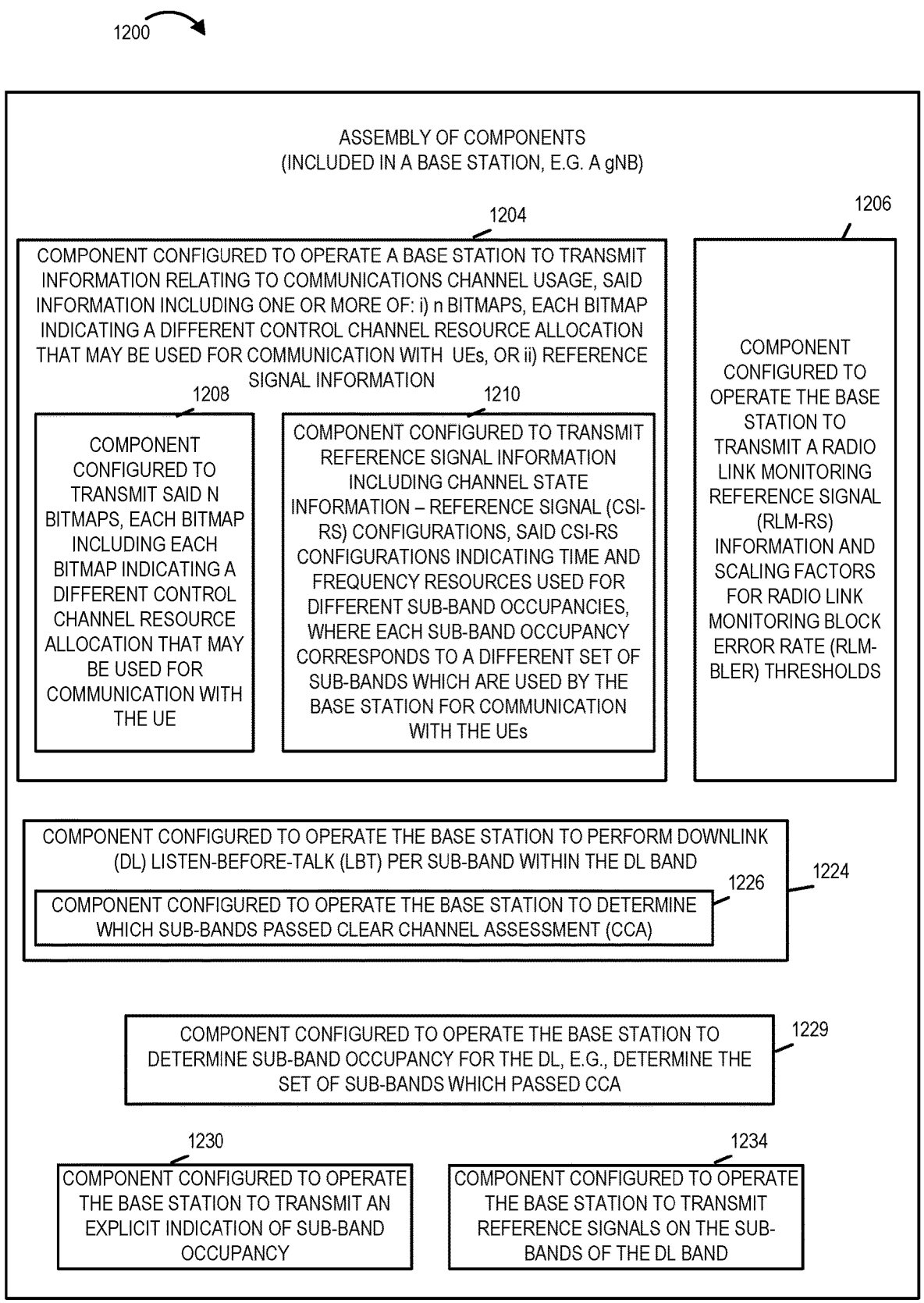
FIG. 12 is a drawing of an exemplary assembly of components which may be included in an exemplary base station, e.g., a gNB or ng-eNB, in accordance with an exemplary embodiment.

FIG. 12 is a drawing of an exemplary assembly of components 1200, in accordance with an exemplary embodiment. Exemplary assembly of components 800 which may be included in a base station, e.g., a gNB or an ng-eNB, such as the exemplary base station 700, e.g., a gNB or ng-eNB, of FIG. 7, and implement steps of an exemplary method, e.g., steps of the method of the flowchart 1100 of FIG. 11.

Assembly of components 1200 can be, and in some embodiments is, used in base station 700, e.g., a gNB or ng-eNB, of FIG. 7, base station 1 104 of FIG. 1, base station 2 106 of FIG. 1 and/or base station n 108 of FIG. 1. The components in the assembly of components 1200 can, and in some embodiments are, implemented fully in hardware within the processor 702, e.g., as individual circuits. The components in the assembly of components 1200 can, and in some embodiments are, implemented fully in hardware within the assembly of components 708, e.g., as individual circuits corresponding to the different components. In other embodiments some of the components are implemented, e.g., as circuits, within the processor 702 with other components being implemented, e.g., as circuits within assembly of components 708, external to and coupled to the processor 702. As should be appreciated the level of integration of components on the processor and/or with some components being external to the processor may be one of design choice. Alternatively, rather than being implemented as circuits, all or some of the components may be implemented in software and stored in the memory 710 of the base station 700, e.g., a gNB or ng-eNB, with the components controlling operation of the base station to implement the functions corresponding to the components when the components are executed by a processor, e.g., processor 702. In some such embodiments, the assembly of components 1200 is included in the memory 710 as assembly of components 722. In still other embodiments, various components in assembly of components 1200 are implemented as a combination of hardware and software, e.g., with another circuit external to the processor 702 providing input to the processor 702 which then under software control operates to perform a portion of a component's function. While processor 702 is shown in the FIG. 7 embodiment as a single processor, e.g., computer, it should be appreciated that the processor 702 may be implemented as one or more processors, e.g., computers.

When implemented in software the components include code, which when executed by the processor 702, configure the processor 702 to implement the function corresponding to the component. In embodiments where the assembly of components 1200 is stored in the memory 710, the memory 710 is a computer program product comprising a computer readable medium comprising code, e.g., individual code for each component, for causing at least one computer, e.g., processor 702, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 12 control and/or configure the base station 700, or elements therein such as the processor 702, to perform the functions of corresponding steps illustrated and/or described in the method of one or more of the flowcharts, signaling diagrams and/or described with respect to any of the Figures. Thus the assembly of components 1200 includes various components that perform functions of corresponding one or more described and/or illustrated steps of an exemplary method, e.g., steps of: the method of flowchart 1100 of Figure and/or described or shown with respect to any of the other figures. In some embodiments, a base station, e.g., base station 700, includes one or more or all of the components in assembly of component 800 and one or more or all of the components in assembly of components 1200.

Assembly of components 1200 includes a component 1204 configured to operate a base station to transmit information relating to communications channel usage, said information including one or more of: i) N bitmaps, each bitmap indicating a different control channel resource utilization that may be used for communication with UEs, or ii) reference signal information. Component 1204 includes a component 1208 configured to operate the base station to transmit said N bitmaps, each bitmap indicating a different control channel resource allocation that may be used for communication with the UEs and a component 1210 configured to operate the base station to transmit reference signal information including channel state information-reference signal (CSI-RS) configurations, said CSI-RS configurations indicating time and frequency resources used for different sub-band occupancies, where each sub-band occupancy corresponds to a different set of sub-bands which are used by the base station for communication with the UEs. Assembly of components 1200 further includes a component 1206 configured to operate the base station to transmit radio link monitoring reference signal (RLM-RS) information and scaling factors for radio link monitoring block error rate (RLM-BLER) thresholds.

Assembly of components 1200 further includes a component 1224 configured to operate the base station to perform downlink (DL) listen-before-talk (LBT) per sub-band within the DL band. Component 1224 includes a component 1226 configured to operate the base station to determine which sub-band passed clear channel assessment (CCA). Assembly of components 1200 further includes a component 1229 configured to operate the base station to determine sub-band occupancy for the downlink, e.g., determine the set of sub-bands which passed CCA, a component 1230 configured to operate the base station to transmit an explicit indication of sub-band occupancy, and a component 1234 configured to operate the base station to transmit reference signals on the sub-bands of the downlink band, e.g. transmit reference signals on the sub-bands of the DL band which have passed CCA at the start of the downlink burst. The reference signals can be, and sometimes are, used by one or more UEs, which are monitoring, to determine which of the sub-bands are occupied in the downlink burst and are being used by the base station to communicate downlink signals with one or more UEs.

Figure 13A:
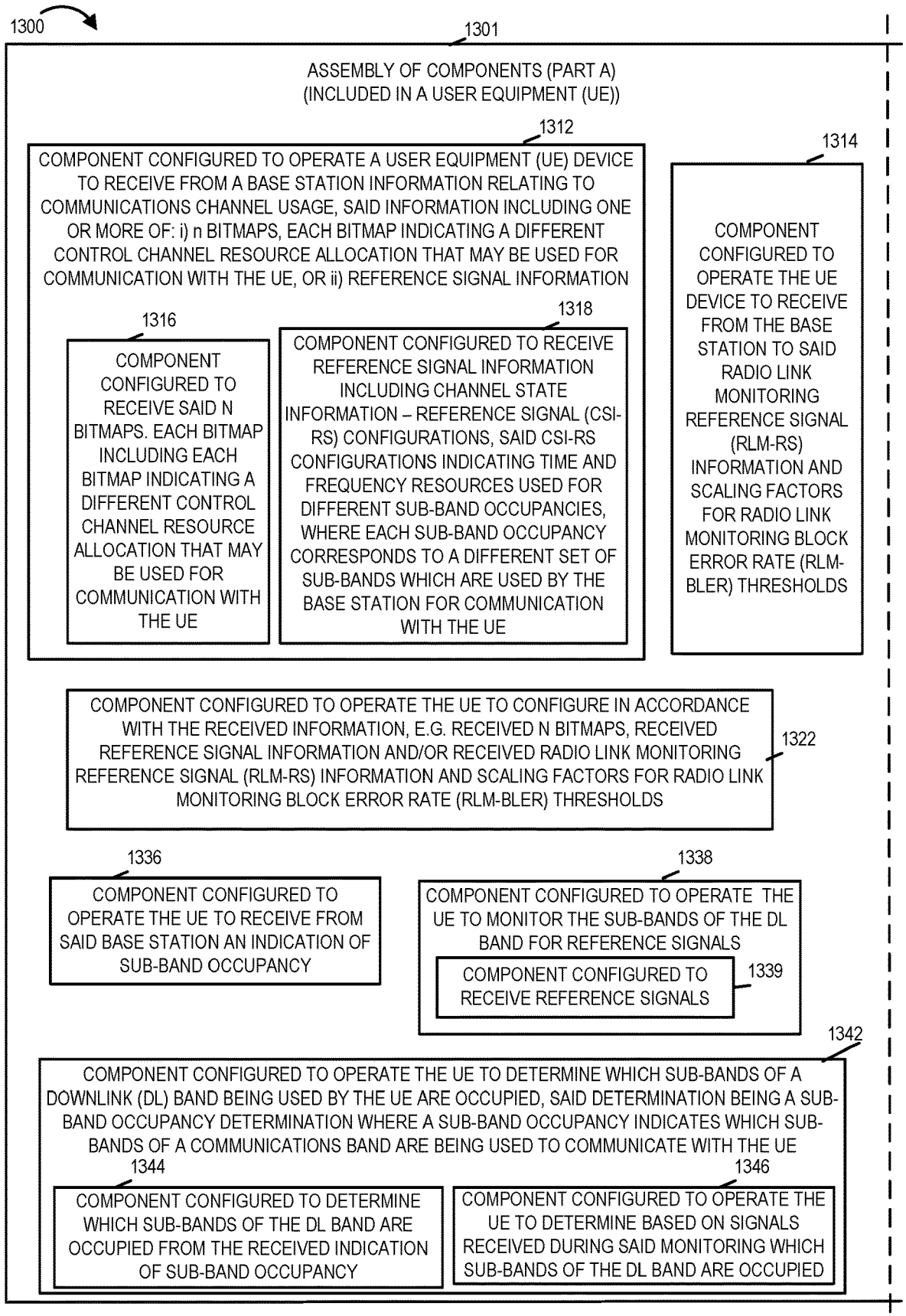
FIG. 13A is a drawing of a first part of an exemplary assembly of components which may be included in an exemplary user equipment (UE) device in accordance with an exemplary embodiment.

FIG. 13, comprising the combination of FIG. 13A and FIG. 13B, is a drawing of an exemplary assembly of components 1300, comprising the combination of Part A 1301 and Part B 1303, in accordance with an exemplary embodiment. Exemplary assembly of components 1300 which may be included in a user equipment (UE) device, e.g., UE device 900 of FIG. 9, and implement steps of an exemplary method, e.g., steps of the method of the flowchart 1100 of FIG. 11.

Assembly of components 1300 can be, and in some embodiments is, used in UE device 900 of FIG. 9, or any of the UEs of FIG. 1, e.g. UE 110 of FIG. 1. The components in the assembly of components 1300 can, and in some embodiments are, implemented fully in hardware within the processor 902, e.g., as individual circuits. The components in the assembly of components 1300 can, and in some embodiments are, implemented fully in hardware within the assembly of components 918, e.g., as individual circuits corresponding to the different components. In other embodiments some of the components are implemented, e.g., as circuits, within the processor 902 with other components being implemented, e.g., as circuits within assembly of components 918, external to and coupled to the processor 902. As should be appreciated the level of integration of components on the processor and/or with some components being external to the processor may be one of design choice. Alternatively, rather than being implemented as circuits, all or some of the components may be implemented in software and stored in the memory 920 of the UE device 900, with the components controlling operation of the UE device to implement the functions corresponding to the components when the components are executed by a processor, e.g., processor 902. In some such embodiments, the assembly of components 1200 is included in the memory 920 as assembly of components 954. In still other embodiments, various components in assembly of components 1300 are implemented as a combination of hardware and software, e.g., with another circuit external to the processor 902 providing input to the processor 902 which then under software control operates to perform a portion of a component's function. While processor 902 is shown in the FIG. 9 embodiment as a single processor, e.g., computer, it should be appreciated that the processor 902 may be implemented as one or more processors, e.g., computers.

When implemented in software the components include code, which when executed by the processor 902, configure the processor 902 to implement the function corresponding to the component. In embodiments where the assembly of components 1300 is stored in the memory 920, the memory 920 is a computer program product comprising a computer readable medium comprising code, e.g., individual code for each component, for causing at least one computer, e.g., processor 902, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 13 control and/or configure the UE 900, or elements therein such as the processor 902, to perform the functions of corresponding steps illustrated and/or described in the method of one or more of the flowcharts, signaling diagrams and/or described with respect to any of the Figures Thus the assembly of components 1300 includes various components that perform functions of corresponding one or more described and/or illustrated steps of an exemplary method, e.g., steps of: the method of flowchart 1100 of FIG. 11 and/or described or shown with respect to any of the other figures. In some embodiments, a UE device, e.g., UE device 900, includes one or more or all of the components in assembly of component 1000 and one or more or all of the components in assembly of components 1300.

Assembly of components 1300 includes a component 1312 configured to operate a UE device to receive information relating to communications channel usage, said information including one or more of: i) N bitmaps, each bitmap indicating a different control channel resource utilization that may be used for communication with the UE, or ii) reference signal information. Component 1312 includes a component 1316 configured to operate the UE to receive said N bitmaps, each bitmap indicating a different control channel resource allocation that may be used for communication with the UE and a component 1318 configured to operate the operate the UE to receive reference signal information including channel state information-reference signal (CSI-RS) configurations, said CSI-RS configurations indicating time and frequency resources used for different sub-band occupancies, where each sub-band occupancy corresponds to a different set of sub-bands which are used by the base station for communication with the UE. Assembly of components 1300 further includes a component 1314 configured to operate the UE to receive radio link monitoring reference signal (RLM-RS) information and scaling factors for radio link monitoring block error rate (RLM-BLER) thresholds.

Assembly of components 1300 further includes a component 1322 configured to operate the UE to configure the UE in accordance with the received information, e.g. received N bitmaps, received reference signal information and/or received radio link monitoring reference signal (RLM-RS) information and scaling factors for radio link monitoring block error rate (RLM-BLER) thresholds, a component 1336 configured to operate the UE to receive from said base station and indication, e.g., an explicit indication of sub-band occupancy, and a component 1338 configured to operate the UE to monitor the sub-bands of the DL band for reference signals. Component 1338 includes a component 1339 configured to operate the UE to receive reference signals, e.g., and store information indicating which of the sub-bands are sub-bands on which a reference signal was detected.

Assembly of components 1300 further includes a component 1342 configured to operate the UE to determine which sub-bands of a downlink (DL) band being used by the UE are occupied, said determination being a sub-band occupancy determination where a sub-band occupancy indicates which sub-bands of a communications band are being used to communicate with the UE. In some embodiments, the sub-band occupancy determination is a dynamic sub-band occupancy determination. Component 1342 includes a component 1344 configured to determine which sub-bands of the DL band are occupied from the received indication, e.g., an explicit indication, of sub-band occupancy, and a component 1346 configured to operate the UE to determine based on signals received during said monitoring which sub-bands of the DL band are occupied.

Assembly of components 1300 further includes a component 1347 configured to operate the UE to determine from one of the N bitmaps, the one bitmap being the bitmap which corresponds to the determined sub-bands of the DL that are occupied, a control resource allocation. Assembly of components 1300 further includes a component 1348 configured to operate the UE to determine, based on the determined sub-band occupancy, a first block error rate (BLER) threshold scaling factor to use to perform in-sync (IS) evaluations, and a component 1349 configured to operate the UE to determine, based on the determined sub-band occupancy, a second block error rate (BLER) threshold scaling factor to use to perform out-of-sync (OOS) evaluations.

Assembly of components 1300 further includes a component 1350 configured to operate the UE to perform at least one of: i) determining CSI-RS measurement locations based on the determined sub-band occupancy or ii) performing at least one of in-sync (IS) or out-of-sync (OOS) evaluations based on the determined sub-band occupancy. Component 1350 includes a component 1352 configured to operate the UE to determine CSI-RS measurement locations based on the determined sub-band occupancy, a component 1354 configured to operate the UE to perform in-sync evaluations based on the determined sub-band occupancy, and a component 1355 configured to operate the UE to perform out-of-sync evaluations based on the determined sub-band occupancy. Component 1352 includes a component 1356 configured to operate the UE to use the determined sub-band occupancy to determine from the received CSI-RS configuration information, CSI-RS measurement locations. Component 1354 includes a component 1358 configured to operate the UE to perform in-sync evaluations based on the determined first BLER threshold scaling factor, e.g., the first BLER threshold scaling factor determined by component 1348. Component 1355 includes a component 1359 configured to operate the UE to perform out-of-sync evaluations based on the determined second BLER threshold scaling factor, e.g., the second BLER threshold scaling factor determined by component 1344. Component 1358 includes a component 13581 configured to multiple a pre-configured BLER threshold corresponding to IS evaluation, by the determined first BLER threshold scaling factor to determine a current BLER threshold to be used to perform IS evaluations. Component 1359 includes a component 13591 configured to multiple a pre-configured BLER threshold corresponding to OOS evaluation, by the determined second BLER threshold scaling factor to determine a current BLER threshold to be used to perform OOS evaluations. Assembly of components 1300 further includes a component 1360 configured to operate the UE to perform CSI-RS measurements on the time and frequency resources indicated by the determined CSI-RS measurement locations.

Figure 14:
FIG. 14 is a table of exemplary sets of sub-bands which are occupied in an exemplary downlink bandwidth portion (DL BWP) and exemplary corresponding bitmaps, in accordance with an exemplary embodiment.

FIG. 14 is a table 1400 of exemplary sets of sub-bands which are occupied in an exemplary downlink bandwidth portion (DL BWP) and exemplary corresponding bitmaps, in accordance with an exemplary embodiment. Column 1402 identifies sets of sub-bands. Column 1404 identifies a different bitmap corresponding to each set of occupied sub-bands shown in column 1402. In one exemplary embodiment, there are four consecutive non-overlapping 20 MHz sub-bands in the BWP, e.g., as shown in the example of FIG. 2.

In some embodiments, there are a different number of 20 MHZ sub-bands in the BWP, e.g. there are two 20 MHz sub-bands in a 40 MHz BWP, and there are 3 different bitmaps.

FIG. 15 is a table 1500 of exemplary sets of sub-bands which are occupied in an exemplary downlink bandwidth portion (DL BWP), numbers of sub-bands which are occupied, and exemplary corresponding scaling factor for out-of-sync (OOS) threshold in accordance with an exemplary embodiment. Column 1502 identifies sets of sub-bands. Column 1504 identifies the number of occupied sub-bands in the DL BWP corresponding to each of the identified sets of sub-bands in column 1502. Column 1506 show exemplary scaling factors for OOS threshold corresponding to each set of occupied sub-bands. In one exemplary embodiment, there are four consecutive non-overlapping 20 MHz sub-bands in the BWP, e.g., as shown in the example of FIG. 2.

In some embodiments, there are a different number of 20 MHZ sub-bands in the BWP, e.g. there are five 20 MHz sub-bands in a 100 MHz BWP, and there are five different scale factors, $\frac{1}{5}$, $\frac{2}{5}$, $\frac{3}{5}$, $\frac{4}{5}$, and 1.

Numbered List of Exemplary Method Embodiments

Method Embodiment 1 A communications method, the method comprising: operating (1112) a user equipment device (UE) to receive from a base station information relating to communications channel usage, said information including one or more of: i) N bitmaps, each bitmap indicating a different control channel resource allocation that may be used for communication with the UE, or ii) reference signal information; operating the UE to determine (1142) which sub-bands of a DL band being used by the UE are occupied, said determination being a sub-band occupancy determination, e.g., a dynamic sub-band occupancy determination, where a sub-band occupancy indicates which sub-bands of a communications band are being used to communicate with the UE; and operating (1150) the UE to perform at least one of: i) determining channel state information-reference signal (CSI-RS) measurement locations based on the determined sub-band occupancy or ii) performing at least one of in-sync (IS) or out-of-sync (OOS) evaluations based on the sub-band occupancy.

Method Embodiment 2 The method of Method Embodiment 1, wherein said method includes, as part of operating (1104) a user equipment device (UE) to receive from a base station information relating to communications channel usage, said information including one or more of: i) N bitmaps, each bitmap indicating a different control channel resource allocation that may be used for communication with the UE, or ii) reference signal information, receiving (1118) reference signal information including CSI-RS configuration information indicating CSI-RS configurations, said CSI-RS configurations indicating time and frequency resources used for different sub-band occupancies, where each sub-band occupancy corresponds to a different set of sub-bands which are used by the base station for communication with the UE.

Method Embodiment 3 The method of Method Embodiment 2, wherein operating (1150) the UE to perform at least one of: i) determining CSI-RS measurement locations based on the determined sub-band occupancy or ii) performing in-sync and out-of-sync evaluations based on the sub-band occupancy includes: operating (1152) the UE to determine CSI-RS measurement locations based on sub-band occupancy, said step of determining (1152) CSI-RSI measurement locations based on sub-band occupancy including operating (1156) the UE to use the determined sub-band occupancy to determine from the received CSI-RS configuration information CSI-RS measurement locations. (e.g., look up what CSI-RS measurement locations correspond, in the received reference signal information, to the sub-band occupancy that was determined).

Method Embodiment 4 The method of Method Embodiment 3, further comprising: operating (1160) the UE to perform CSI-RS measurements on the time and frequency resources indicated by the determined CSI-RS measurement locations.

Method Embodiment 5 The method of Method Embodiment 1, wherein operating (1150) the UE to perform at least one of: i) determining CSI-RS measurement locations based on the determined sub-band occupancy or ii) performing in-sync and out-of-sync evaluations based on the sub-band occupancy includes: performing (1154) in-sync evaluations based on the sub-band occupancy.

Method Embodiment 6 The method of Method Embodiment 4, wherein performing (1154) in-sync evaluations is further based (1158) on a BLER threshold scaling factor.

Method Embodiment 7 The method of claim 6, further comprising: operating (1148) the UE to determine the BLER threshold scaling factor to use to perform said in-sync evaluation based on the determined sub-band occupancy (determine the scaling factor based on the determined sub-band occupancy, i.e., the number of sub-bands being used).

Method Embodiment 8 The method of Method Embodiment 1, further comprising: operating (1136) the UE to receive from the base station an indication, e.g., an explicit indication, of sub-band occupancy; and wherein operating (1142) the UE to determine which sub-bands of a DL band being used by the UE are occupied includes determining (1144) which sub-bands of the DL band are occupied from the received indication of sub-band occupancy.

Method Embodiment 9 The method of Method Embodiment 1, further comprising: operating (1138) the UE to monitor the sub-bands of the DL for reference signals; and wherein operating (1142) the UE to determine which sub-bands of a DL band being used by the UE are occupied includes: operating (1146) the UE to determine based on signals received during said monitoring which sub-bands of the DL band are occupied.

Method Embodiment 10 The method of Method Embodiment 1, wherein operating (1112) a user equipment device (UE) to receive from the base station information relating to communications channel usage, includes (1116) receiving said N bitmaps, each bitmap indicating a different control channel resource allocation that may be used for communication with the UE; and operating (1147) the UE to determine from one of the N bitmaps corresponding to the determined sub-bands of the DL band that are occupied, a control resource allocation.

Method Embodiment 11 The method of Method Embodiment 1, wherein the DL band corresponds to unlicensed spectrum.

Numbered List of Exemplary Apparatus Embodiments

Apparatus Embodiment 1 A user equipment (UE) device (110) comprising: a receiver (938); and a processor (902) configured to: operate (1112) the user equipment (UE) device to receive from a base station (104) information relating to communications channel usage, said information including one or more of: i) N bitmaps, each bitmap indicating a different control channel resource allocation that may be used for communication with the UE, or ii) reference signal information; determine (1142) which sub-bands of a DL band being used by the UE are occupied, said determination being a sub-band occupancy determination, e.g., a dynamic sub-band occupancy determination, where a sub-band occupancy indicates which sub-bands of a communications band are being used to communicate with the UE; and operate (1150) the UE to perform at least one of: i) determining channel state information-reference signal (CSI-RS) measurement locations based on the determined sub-band occupancy or ii) performing at least one of in-sync (IS) or out-of-sync (OOS) evaluations based on the sub-band occupancy.

Apparatus Embodiment 2 The UE device of Apparatus Embodiment 1, wherein said processor is configured, as part of being configured to operate (1104) a user equipment device (UE) to receive from a base station information relating to communications channel usage, said information including one or more of: i) N bitmaps, each bitmap indicating a different control channel resource allocation that maybe used for communication with the UE, or ii) reference signal information, to receive (1118) reference signal information including CSI-RS configuration information indicating CSI-RS configurations, said CSI-RS configurations indicating time and frequency resources used for different sub-band occupancies, where each sub-band occupancy corresponds to a different set of sub-bands which are used by the base station for communication with the UE.

Apparatus Embodiment 3 The UE device of Apparatus Embodiment 2, wherein said processor is configured, as part of being configured to operate (1150) the UE to perform at least one of: i) determining CSI-RS measurement locations based on the determined sub-band occupancy or ii) performing in-sync and out-of-sync evaluations based on the sub-band occupancy, to: operate (1152) the UE to determine CSI-RS measurement locations based on sub-band occupancy, said step of determining (1152) CSI-RSI measurement locations based on sub-band occupancy including operating (1156) the UE to use the determined sub-band occupancy to determine from the received CSI-RS configuration information CSI-RS measurement locations. (e.g., look up what CSI-RS measurement locations correspond, in the received reference signal information, to the sub-band occupancy that was determined).

Apparatus Embodiment 4 The UE device of Apparatus Embodiment 3, wherein said processor is further configured to: operate (1160) the UE to perform CSI-RS measurements on the time and frequency resources indicated by the determined CSI-RS measurement locations.

Apparatus Embodiment 5 The UE device of Apparatus Embodiment 1, wherein said processor is configured, as part of being configured to operate (1150) the UE to perform at least one of: i) determining CSI-RS measurement locations based on the determined sub-band occupancy or ii) performing in-sync and out-of-sync evaluations based on the sub-band occupancy, to: perform (1154) in-sync evaluations based on the sub-band occupancy.

Apparatus Embodiment 6 The UE device of Apparatus Embodiment 4, wherein said processor is configured, as part of being configured to perform (1154) in-sync evaluations, to base (1158) the in-sync evaluation on a BLER threshold scaling factor.

Apparatus Embodiment 7 The UE device of Apparatus Embodiment 6, wherein said processor is further configured to: determine (1148) the BLER threshold scaling factor to use to perform said in-sync evaluation based on the determined sub-band occupancy (determine the scaling factor based on the determined sub-band occupancy, i.e., the number of sub-bands being used).

Apparatus Embodiment 8 The UE device of Apparatus Embodiment 1, wherein said processor is further configured to: operate (1136) the UE to receive from the base station an indication, e.g., an explicit indication, of sub-band occupancy; and wherein said processor is configured, as part of being configured to operate (1142) the UE to determine which sub-bands of a DL band being used by the UE are occupied, to determine (1144) which sub-bands of the DL band are occupied from the received indication of sub-band occupancy.

Apparatus Embodiment 9 The UE device of Apparatus Embodiment 1, wherein said processor is further configured to: operate (1138) the UE to monitor the sub-bands of the DL for reference signals; and wherein, said processor is configured, as part of being configured to operate (1142) the UE to determine which sub-bands of a DL band being used by the UE are occupied, to operate (1146) the UE to determine based on signals received during said monitoring which sub-bands of the DL band are occupied.

Apparatus Embodiment 10 The UE device of Apparatus Embodiment 1, wherein said processor is configured, as part of being configured to operate (1112) a user equipment device (UE) to receive from the base station information relating to communications channel usage, to operate the UE to receive (1116) said N bitmaps, each bitmap indicating a different control channel resource allocation that may be used for communication with the UE; and wherein said processor is further configured to determine (1147) from one of the N bitmaps corresponding to the determined sub-bands of the DL band that are occupied, a control resource allocation.

Apparatus Embodiment 11 The UE device of Apparatus Embodiment 1, wherein the DL band corresponds to unlicensed spectrum.

Numbered List of Exemplary Non-transitory Computer Readable Medium Embodiments:

Non-transitory computer readable medium embodiment 1. A non-transitory computer readable medium (920) including computer executable instructions which when executed by a processor (902) control a user equipment (UE) device (900) using unlicensed spectrum to perform the steps of: operating (1112) the UE device to receive from a base station information relating to communications channel usage, said information including one or more of: i) N bitmaps, each bitmap indicating a different control channel resource allocation that may be used for communication with the UE, or ii) reference signal information; operating (1142) the UE device to determine which sub-bands of a DL band being used by the UE are occupied, said determination being a sub-band occupancy determination where a sub-band occupancy indicates which sub-bands of a communications band are being used to communicate with the UE; and operating (1150) the UE device to perform at least one of: i) determining channel state information-reference signal (CSI-RS) measurement locations based on the determined sub-band occupancy or ii) performing at least one of in-sync (IS) or out-of-sync (OOS) evaluations based on the sub-band occupancy.

The techniques of various embodiments may be implemented using software, hardware and/or a combination of software and hardware. Various embodiments are directed to apparatus, e.g., user devices such as a user equipment (UE) device, base stations such as a gNB or ng-eNB, network nodes, an AMF device, servers, customer premises equipment devices, cable systems, network nodes, gateways, cable headend/hubsites, network monitoring node/servers, cluster controllers, cloud nodes, production nodes, cloud services servers and/or network equipment devices. Various embodiments are also directed to methods, e.g., method of controlling and/or operating user devices, base stations, gateways, servers, cable networks, cloud networks, nodes, servers, cloud service servers, customer premises equipment devices, controllers, network monitoring nodes/servers and/or cable or network equipment devices. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes and methods disclosed is an example of exemplary approaches. Based upon design preferences, it is understood that the specific order or hierarchy of steps in the processes and methods may be rearranged while remaining within the scope of the present disclosure. The accompanying method claims present elements of the various steps in a sample order, and are not meant to be limited to the specific order or hierarchy presented. In some embodiments, one or more processors are used to carry out one or more steps of the each of the described methods.

In various embodiments each of the steps or elements of a method are implemented using one or more processors. In some embodiments, each of elements are steps are implemented using hardware circuitry.

In various embodiments nodes and/or elements described herein are implemented using one or more components to perform the steps corresponding to one or more methods, for example, message reception, signal processing, sending, comparing, determining and/or transmission steps. Thus, in some embodiments various features are implemented using components or in some embodiments logic such as for example logic circuits. Such components may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., a controller, including a processor configured to implement one, multiple or all of the steps of one or more methods of the invention.

In some embodiments, the processor or processors, e.g., CPUs, of one or more devices, e.g., communications nodes such as controllers are configured to perform the steps of the methods described as being performed by the communications nodes, e.g., controllers. The configuration of the processor may be achieved by using one or more components, e.g., software components, to control processor configuration and/or by including hardware in the processor, e.g., hardware components, to perform the recited steps and/or control processor configuration. Accordingly, some but not all embodiments are directed to a device, e.g., communications node such as a cluster controller including, with a processor which includes a component corresponding to each of the steps of the various described methods performed by the device in which the processor is included. In some but not all embodiments a device, e.g., communications node such as a controller, includes a controller corresponding to each of the steps of the various described methods performed by the device in which the processor is included. The components may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a controller or node. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device such as a controller or other device described in the present application. In some embodiments components are implemented as hardware devices in such embodiments the components are hardware components. In other embodiments components may be implemented as software, e.g., a set of processor or computer executable instructions. Depending on the embodiment the components maybe all hardware components, all software components, a combination of hardware and/or software or in some embodiments some components are hardware components while other components are software components.

Numerous additional variations on the methods and apparatus of the various embodiments described above will be apparent to those skilled in the art in view of the above description. Such variations are to be considered within the scope. Numerous additional embodiments, within the scope of the present invention, will be apparent to those of ordinary skill in the art in view of the above description and the claims which follow. Such variations are to be considered within the scope of the invention.

What is claimed is:

1. A communications method, the method comprising:
   operating a user equipment (UE) device to receive from a base station information relating to communications channel usage, said information including one or more of: i) N bitmaps, each bitmap indicating a different control channel resource allocation that may be used for communication with the UE, or ii) reference signal information, wherein operating the UE device to receive from the base station information relating to communications channel usage includes operating the UE device to receive said N bitmaps, each bitmap indicating a different control channel resource allocation that may be used for communication with the UE device;
   operating the UE device to determine which sub-bands of a downlink (DL) band being used by the UE device are occupied, said determination being a sub-band occupancy determination where a sub-band occupancy indicates which sub-bands of a communications band are being used to communicate with the UE device;
   operating the UE device to determine from one of the N bitmaps corresponding to the determined sub-bands of the DL band that are occupied, a control resource allocation; and
   operating the UE device to perform at least one of: i) determining channel state information-reference signal (CSI-RS) measurement locations based on the determined sub-band occupancy or ii) performing at least one of in-sync (IS) or out-of-sync (OOS) evaluations based on the sub-band occupancy.

2. The method of claim 1, wherein said method includes, as part of operating a user equipment (UE) device to receive from a base station information relating to communications channel usage, said information including one or more of: i) N bitmaps, each bitmap indicating a different control channel resource allocation that may be used for communication with the UE device, or ii) reference signal information, receiving reference signal information including CSI-RS configuration information indicating CSI-RS configurations, said CSI-RS configurations indicating time and frequency resources used for different sub-band occupancies, where each sub-band occupancy corresponds to a different set of sub-bands which are used by the base station for communication with the UE device.

3. The method of claim 2, wherein operating the UE device to perform at least one of: i) determining CSI-RS measurement locations based on the determined sub-band occupancy or ii) performing in-sync and out-of-sync evaluations based on the sub-band occupancy includes:
   operating the UE device to determine CSI-RS measurement locations based on sub-band occupancy, said step of determining CSI-RSI measurement locations based on sub-band occupancy including operating the UE device to use the determined sub-band occupancy to determine from the received CSI-RS configuration information CSI-RS measurement locations.

4. The method of claim 3, further comprising:
   operating the UE device to perform CSI-RS measurements on the time and frequency resources indicated by the determined CSI-RS measurement locations.

5. The method of claim 1, wherein operating the UE device to perform at least one of: i) determining CSI-RS measurement locations based on the determined sub-band occupancy or ii) performing in-sync and out-of-sync evaluations based on the sub-band occupancy includes:
   performing in-sync evaluations based on the sub-band occupancy.

6. The method of claim 1, further comprising:
   operating the UE device to receive from the base station an indication of sub-band occupancy; and
   wherein operating the UE device to determine which sub-bands of a DL band being used by the UE are occupied includes determining which sub-bands of the DL band are occupied from the received indication of sub-band occupancy.

7. The method of claim 1, further comprising:
   operating the UE device to monitor the sub-bands of the DL for reference signals; and
   wherein operating the UE device to determine which sub-bands of a DL band being used by the UE are occupied includes:
      operating the UE device to determine based on signals received during said monitoring which sub-bands of the DL band are occupied.

8. The method of claim 1, wherein the DL band corresponds to unlicensed spectrum.

9. A communications method, the method comprising:
operating a user equipment device (UE) to receive from a base station information relating to communications channel usage, said information including one or more of: i) N bitmaps, each bitmap indicating a different control channel resource allocation that may be used for communication with the UE device, or ii) reference signal information,
wherein operating the UE device to receive from a base station information relating to communications channel usage, said information including one or more of: i) N bitmaps, each bitmap indicating a different control channel resource allocation that may be used for communication with the UE device, or ii) reference signal information, includes:
operating the UE device to receive reference signal information including channel state information-reference signal (CSI-RS) configuration information indicating CSI-RS configurations, said CSI-RS configurations indicating time and frequency resources used for different sub-band occupancies, where each sub-band occupancy corresponds to a different set of sub-bands which are used by the base station for communication with the UE device;
operating the UE device to determine which sub-bands of a downlink (DL) band being used by the UE device are occupied, said determination being a sub-band occupancy determination where a sub-band occupancy indicates which sub-bands of a communications band are being used to communicate with the UE device; and
operating the UE device to perform at least one of: i) determining CSI-RS measurement locations based on the determined sub-band occupancy or ii) performing at least one of in-sync (IS) or out-of-sync (OOS) evaluations based on the sub-band occupancy,
wherein operating the UE device to perform at least one of: i) determining CSI-RS measurement locations based on the determined sub-band occupancy or ii) performing in-sync and out-of-sync evaluations based on the sub-band occupancy includes:
operating the UE device to determine CSI-RS measurement locations based on sub-band occupancy, said step of determining CSI-RSI measurement locations based on sub-band occupancy including operating the UE device to use the determined sub-band occupancy to determine from the received CSI-RS configuration information CSI-RS measurement locations;
operating the UE device to perform CSI-RS measurements on the time and frequency resources indicated by the determined CSI-RS measurement locations;
and wherein performing in-sync evaluations is further based on a Block Error Rate (BLER) threshold scaling factor.

10. The method of claim 9, further comprising:
operating the UE device to determine the BLER threshold scaling factor to use to perform said in-sync evaluation based on the determined sub-band occupancy.

11. A user equipment (UE) device comprising:
a receiver; and
a processor configured to:
operate the user equipment (UE) device to receive from a base station information relating to communications channel usage, said information including one or more of: i) N bitmaps, each bitmap indicating a different control channel resource allocation that may be used for communication with the UE device, or ii) reference signal information, wherein operating the UE device to receive from the base station information relating to communications channel usage includes operating the UE to receive said N bitmaps, each bitmap indicating a different control channel resource allocation that may be used for communication with the UE device;
determine which sub-bands of a downlink (DL) band being used by the UE device are occupied, said determination being a sub-band occupancy determination where a sub-band occupancy indicates which sub-bands of a communications band are being used to communicate with the UE device;
determine from one of the N bitmaps corresponding to the determined sub-bands of the DL band that are occupied, a control resource allocation; and
operate the UE device to perform at least one of: i) determining channel state information-reference signal (CSI-RS) measurement locations based on the determined sub-band occupancy or ii) performing at least one of in-sync (IS) or out-of-sync (OOS) evaluations based on the sub-band occupancy.

12. The UE device of claim 11, wherein said processor is configured, as part of being configured to operate a user equipment (UE) device to receive from a base station information relating to communications channel usage, said information including one or more of: i) N bitmaps, each bitmap indicating a different control channel resource allocation that may be used for communication with the UE device, or ii) reference signal information, to receive reference signal information including CSI-RS configuration information indicating CSI-RS configurations, said CSI-RS configurations indicating time and frequency resources used for different sub-band occupancies, where each sub-band occupancy corresponds to a different set of sub-bands which are used by the base station for communication with the UE device.

13. The UE device of claim 12, wherein said processor is configured, as part of being configured to operate the UE device to perform at least one of: i) determining CSI-RS measurement locations based on the determined sub-band occupancy or ii) performing in-sync and out-of-sync evaluations based on the sub-band occupancy, to:
operate the UE device to determine CSI-RS measurement locations based on sub-band occupancy, said step of determining CSI-RSI measurement locations based on sub-band occupancy including operating the UE device to use the determined sub-band occupancy to determine from the received CSI-RS configuration information CSI-RS measurement locations.

14. The UE device of claim 13, wherein said processor is further configured to:
operate the UE device to perform CSI-RS measurements on the time and frequency resources indicated by the determined CSI-RS measurement locations.

15. The UE device of claim 11, wherein said processor is configured, as part of being configured to operate the UE device to perform at least one of: i) determining CSI-RS measurement locations based on the determined sub-band occupancy or ii) performing in-sync and out-of-sync evaluations based on the sub-band occupancy, to:
perform in-sync evaluations based on the sub-band occupancy.

16. The UE device of claim 11, wherein said processor is further configured to:
- operate the UE device to receive from the base station an indication of sub-band occupancy; and
- wherein said processor is configured, as part of being configured to operate the UE to determine which sub-bands of a DL band being used by the UE device are occupied, to determine which sub-bands of the DL band are occupied from the received indication of sub-band occupancy.

17. The UE device of claim 11, wherein said processor is further configured to:
- operate the UE device to monitor the sub-bands of the DL for reference signals; and
- wherein, said processor is configured, as part of being configured to operate the UE device to determine which sub-bands of a DL band being used by the UE device are occupied, to operate the UE device to determine based on signals received during said monitoring which sub-bands of the DL band are occupied.

18. A user equipment (UE) device comprising:
a receiver; and
a processor configured to:
- operate the user equipment (UE) device to receive from a base station information relating to communications channel usage, said information including one or more of: i) N bitmaps, each bitmap indicating a different control channel resource allocation that may be used for communication with the UE, or ii) reference signal information;
- determine which sub-bands of a DL downlink (DL) band being used by the UE device are occupied, said determination being a sub-band occupancy determination where a sub-band occupancy indicates which sub-bands of a communications band are being used to communicate with the UE device; and
- operate the UE device to perform at least one of: i) determining channel state information-reference signal (CSI-RS) measurement locations based on the determined sub-band occupancy or ii) performing at least one of in-sync (IS) or out-of-sync (OOS) evaluations based on the sub-band occupancy; and wherein said processor is configured, as part of being configured to operate a user equipment (UE) device to receive from a base station information relating to communications channel usage, said information including one or more of: i) N bitmaps, each bitmap indicating a different control channel resource allocation that may be used for communication with the UE device, or ii) reference signal information, to receive reference signal information including CSI-RS configuration information indicating CSI-RS configurations, said CSI-RS configurations indicating time and frequency resources used for different sub-band occupancies, where each sub-band occupancy corresponds to a different set of sub-bands which are used by the base station for communication with the UE device;

wherein said processor is configured, as part of being configured to operate the UE device to perform at least one of: i) determining CSI-RS measurement locations based on the determined sub-band occupancy or ii) performing in-sync and out-of-sync evaluations based on the sub-band occupancy, to operate the UE device to determine CSI-RS measurement locations based on sub-band occupancy, said step of determining CSI-RSI measurement locations based on sub-band occupancy including operating the UE device to use the determined sub-band occupancy to determine from the received CSI-RS configuration information CSI-RS measurement locations;

wherein said processor is further configured to: operate the UE device to perform CSI-RS measurements on the time and frequency resources indicated by the determined CSI-RS measurement locations;

wherein said processor is configured, as part of being configured to perform in-sync evaluations, to base the in-sync evaluation on a Block Error Rate (BLER) threshold scaling factor; and wherein said processor is further configured to determine the BLER threshold scaling factor to use to perform said in-sync evaluation based on the determined sub-band occupancy.

19. A non-transitory computer readable medium including computer executable instructions which when executed by a processor control a user equipment (UE) device using unlicensed spectrum to perform the steps of:
- operating the UE device to receive from a base station information relating to communications channel usage, said information including one or more of: i) N bitmaps, each bitmap indicating a different control channel resource allocation that may be used for communication with the UE device, or ii) reference signal information, wherein operating the UE device to receive from the base station information relating to communications channel usage includes operating the UE device to receive said N bitmaps, each bitmap indicating a different control channel resource allocation that may be used for communication with the UE device;
- operating the UE device to determine which sub-bands of a downlink (DL) band being used by the UE device are occupied, said determination being a sub-band occupancy determination where a sub-band occupancy indicates which sub-bands of a communications band are being used to communicate with the UE device;
- operating the UE device to determine from one of the N bitmaps corresponding to the determined sub-bands of the DL band that are occupied, a control resource allocation; and
- operating the UE device to perform at least one of: i) determining channel state information-reference signal (CSI-RS) measurement locations based on the determined sub-band occupancy or ii) performing at least one of in-sync (IS) or out-of-sync (OOS) evaluations based on the sub-band occupancy.

\* \* \* \* \*